United States Patent
Awai

(10) Patent No.: US 12,223,958 B2
(45) Date of Patent: Feb. 11, 2025

(54) INFORMATION PROCESSING SYSTEM, INFORMATION PROCESSING DEVICE, AND INFORMATION PROCESSING METHOD

(71) Applicant: SONY GROUP CORPORATION, Tokyo (JP)

(72) Inventor: Shoichi Awai, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 291 days.

(21) Appl. No.: 17/756,027

(22) PCT Filed: Nov. 10, 2020

(86) PCT No.: PCT/JP2020/041906
§ 371 (c)(1),
(2) Date: May 13, 2022

(87) PCT Pub. No.: WO2021/100555
PCT Pub. Date: May 27, 2021

(65) Prior Publication Data
US 2022/0406306 A1    Dec. 22, 2022

(30) Foreign Application Priority Data

Nov. 21, 2019 (JP) .................................. 2019-210747

(51) Int. Cl.
*G10L 15/22* (2006.01)
*G10L 15/08* (2006.01)
(Continued)

(52) U.S. Cl.
CPC .............. *G10L 15/22* (2013.01); *G10L 15/08* (2013.01); *G10L 21/0224* (2013.01);
(Continued)

(58) Field of Classification Search
CPC .. G10L 2015/088; G10L 19/018; G10L 15/02; G10L 15/08; G10L 15/04;
(Continued)

(56) References Cited

U.S. PATENT DOCUMENTS 10,365,887 B1 *   7/2019   Mulherkar ............... G06F 3/167
10,629,202 B2 *   4/2020   Ikeno ..................... G10L 15/222
(Continued)

FOREIGN PATENT DOCUMENTS

| CA | 3075249 A1 | 3/2019 |
|---|---|---|
| CN | 1399247 A | 2/2003 |

(Continued)

OTHER PUBLICATIONS

International Search Report and Written Opinion of PCT Application No. PCT/JP2020/041906, issued on Jan. 12, 2021, 13 pages of ISRWO.

*Primary Examiner* — Vijay B Chawan
(74) *Attorney, Agent, or Firm* — CHIP LAW GROUP

(57) ABSTRACT

Provided is an information processing system including an information processing device and a playback device, the information processing device including a first detection unit that detects, from collected sound, audio processing superimposed on the sound by the playback device, a specifying unit that specifies an utterance subject of the sound on the basis of the audio processing that has been detected, and a determination unit that determines whether or not to execute a command included in the sound on the basis of a result of the specification.

17 Claims, 13 Drawing Sheets

(51) Int. Cl.
*G10L 21/0224* (2013.01)
*G10L 25/84* (2013.01)
*G10L 21/0208* (2013.01)

(52) U.S. Cl.
CPC ........ *G10L 25/84* (2013.01); *G10L 2015/088* (2013.01); *G10L 2015/223* (2013.01); *G10L 2021/02082* (2013.01)

(58) Field of Classification Search
CPC ............... G10L 2015/223; G10L 15/22; G10L 2021/02082; G10L 21/0224; G10L 15/26; G10L 15/24; G10L 25/84
See application file for complete search history.

(56) References Cited

U.S. PATENT DOCUMENTS

| | | | | |
|---|---|---|---|---|
| 2003/0018479 A1* | 1/2003 | Oh | ...................... | G10L 21/0272 704/E19.009 |
| 2003/0028380 A1* | 2/2003 | Freeland | ................. | G10L 13/00 704/260 |
| 2017/0229119 A1* | 8/2017 | Jang | ......................... | G10L 15/08 |
| 2018/0308478 A1* | 10/2018 | Ikeno | ....................... | G10L 15/22 |
| 2018/0332340 A1* | 11/2018 | Ogle | ................... | H04N 21/4131 |
| 2018/0350356 A1* | 12/2018 | Garcia | .................... | G10L 15/20 |
| 2018/0376243 A1* | 12/2018 | Nagel | ................... | H04R 25/405 |
| 2019/0295529 A1* | 9/2019 | Tomita | .................. | G10L 15/187 |
| 2020/0035232 A1* | 1/2020 | Garcia | .................... | G06F 3/167 |
| 2021/0407520 A1* | 12/2021 | Neckermann | ............ | G10L 17/16 |

FOREIGN PATENT DOCUMENTS

| | | |
|---|---|---|
| CN | 108735207 A | 11/2018 |
| CN | 110214351 A | 9/2019 |
| CN | 111052231 A | 4/2020 |
| EP | 1278183 A1 | 1/2003 |
| EP | 3430618 A1 | 1/2019 |
| JP | 2000-075896 A | 3/2000 |
| JP | 2002-182679 A | 6/2002 |
| JP | 2003-044069 A | 2/2003 |
| JP | 2005-338454 A | 12/2005 |
| JP | 2018-185401 A | 11/2018 |
| JP | 2020-511682 A | 4/2020 |
| KR | 10-2003-0008726 A | 1/2003 |
| KR | 10-2017-0093491 A | 8/2017 |
| KR | 10-2019-0103308 A | 9/2019 |
| WO | 2018/226283 A1 | 12/2018 |
| WO | 2019/054199 A1 | 3/2019 |

* cited by examiner

INFORMATION PROCESSING SYSTEM, INFORMATION PROCESSING DEVICE, AND INFORMATION PROCESSING METHOD

CROSS REFERENCE TO RELATED APPLICATIONS

This application is a U.S. National Phase of International Patent Application No. PCT/JP2020/041906 filed on Nov. 10, 2020, which claims priority benefit of Japanese Patent Application No. JP 2019-210747 filed in the Japan Patent Office on Nov. 21, 2019. Each of the above-referenced applications is hereby incorporated herein by reference in its entirety.

FIELD

The present disclosure relates to an information processing system, an information processing device, an information processing method, and a program.

BACKGROUND

In recent years, speech recognition technology has evolved, and information processing devices, which recognize uttered speech including a predetermined command uttered by a user and perform a predetermined operation depending on a recognition result, are widespread. For example, examples of such an information processing device include technology disclosed in Patent Literature 1 below.

CITATION LIST

Patent Literature

Patent Literature 1: JP 2002-182679 A

SUMMARY

Technical Problem

However, there are cases where an audio playback device such as a television (hereinafter referred to as a TV) may be present around an information processing device. In such a case, there are cases where the information processing device recognizes, instead of user's uttered speech, reproduction audio output from the audio playback device and causes an erroneous operation not intended by the user, such as performing a predetermined operation depending on a recognition result of the reproduction audio.

Therefore, the present disclosure proposes an information processing system, an information processing device, an information processing method, and a program capable of avoiding erroneous operation by speech recognition.

Solution to Problem

According to the present disclosure, an information processing system is provided. The information processing system includes an information processing device and a playback device. In the information processing system, the information processing device includes: first detection unit that detects, from collected sound, audio processing superimposed on the sound by the playback device; specifying unit that specifies an utterance subject of the sound on a basis of the audio processing that has been detected; and determination unit that determines whether or not to execute a command included in the sound on a basis of a result of the specification.

Also, according to the present disclosure, an information processing device is provided. The information processing device includes: a first detection unit that detects, from sound that has been collected, the number of echoes superimposed on the sound or a delay time of an echo as audio processing; a specifying unit that specifies an utterance subject of the sound on a basis of the audio processing that has been detected; and a determination unit that determines whether or not to execute a command included in the sound on a basis of a result of the specification. And, the information processing device is installed in an acoustically closed space in which a predetermined user is present.

Also, according to the present disclosure, an information processing method is provided. The information processing method includes the steps of: by an information processing device, detecting, from collected sound, audio processing superimposed on the sound by a playback device; specifying an utterance subject of the sound on a basis of the audio processing that has been detected; and determining whether or not to execute a command included in the sound on a basis of a result of the specification.

Moreover, according to the present disclosure, a program is provided. The program causes a computer to implement a function of detecting, from collected sound, audio processing superimposed on the sound by a playback device; specifying an utterance subject of the sound on a basis of the audio processing that has been detected; and determining whether or not to execute a command included in the sound on a basis of a result of the specification.

DESCRIPTION OF EMBODIMENTS

Hereinafter, preferred embodiments of the present disclosure will be described in detail by referring to the accompanying drawings. Note that, in the present specification and the drawings, components having substantially the same functional configuration are denoted by the same symbols, and redundant description is omitted. Meanwhile, in the present specification and the drawings, a plurality of components having substantially the same or similar functional configurations may be distinguished by attaching different alphabets after the same symbol. However, in a case where it is not particularly necessary to distinguish each of the plurality of components having substantially the same or similar functional configurations, only the same symbol is attached.

In the present specification, unless otherwise specified, a trigger word (predetermined word) is a command that causes an information processing device such as a smart speaker to perform a predetermined operation (such as activation of the information processing device) when input by speech to the information processing device by utterance of a person or a specific person (predetermined user). Specifically, a trigger word is also a command for causing an information processing device to execute speech recognition on speech that follows the trigger word. Predetermined words are extracted from the speech subsequent to the trigger word by the speech recognition that has been executed, and processing related to the words is executed. Therefore, a wake word such as a predetermined addressing word used to activate an information processing device is also included in the trigger words. Note that, in embodiments described below, it is based on the premise that words to be a trigger word are set in advance on an information processing device side.

Note that the description will be given in the following order.

Figure 1:
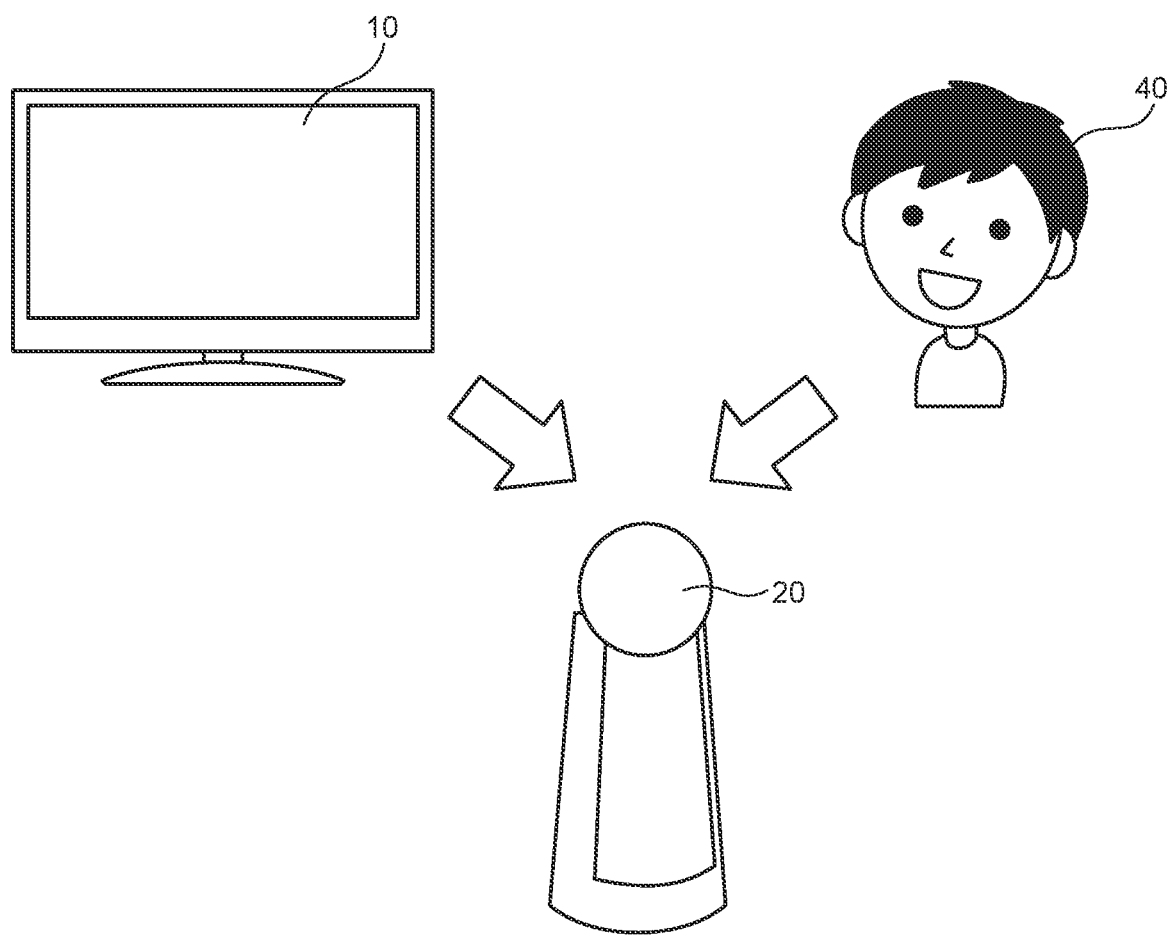
FIG. 1 is an explanatory diagram explaining a configuration example of an information processing system according to an embodiment of the present disclosure.
Figure 2:
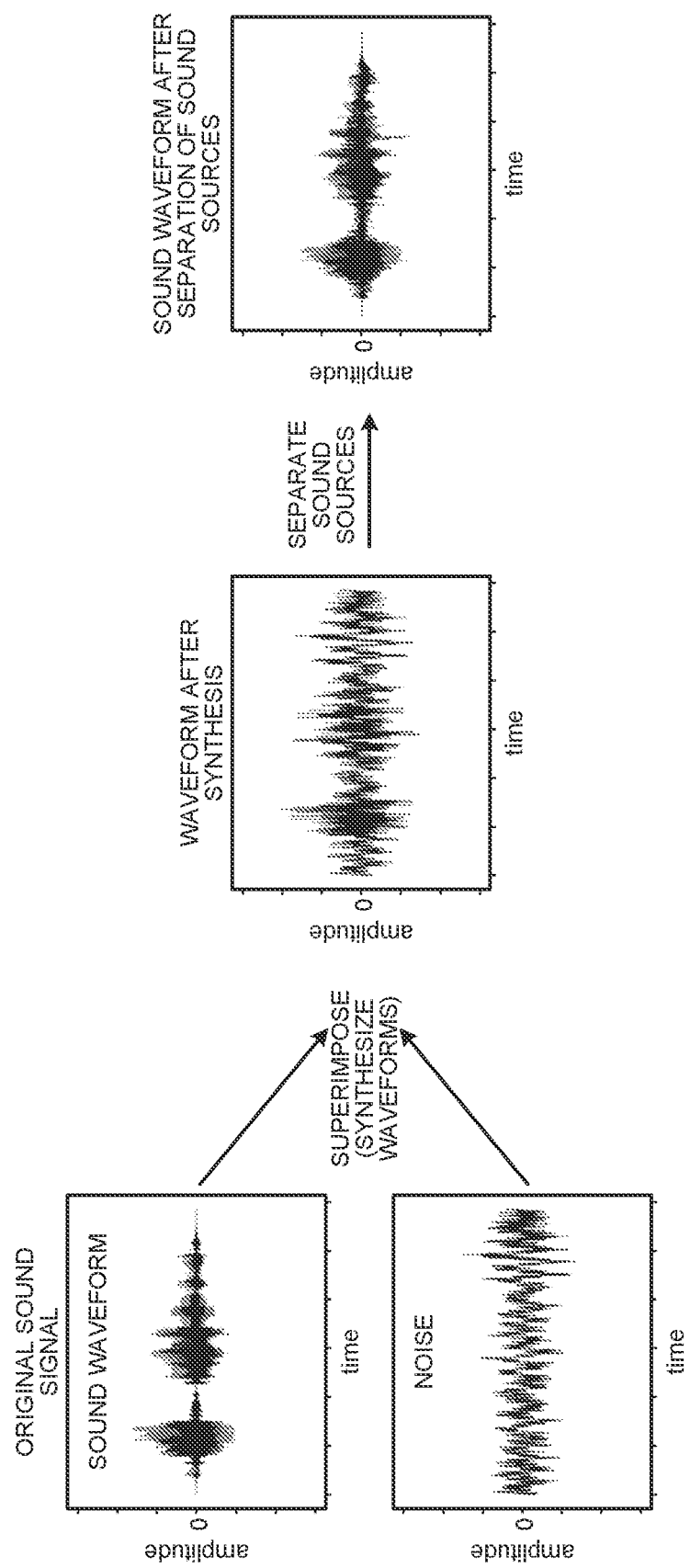
FIG. 2 is an explanatory diagram for explaining the embodiment.

1. Background of Creation of Embodiments of Present Disclosure
2. First Embodiment
2.1 Information Processing System
2.2 Playback Device
2.3 Smart Speaker
2.4 Information Processing Method
3. Second Embodiment
3.1 Information Processing System
3.2 Playback Device
3.3 Smart Speaker
3.4 Information Processing Method
4. Third Embodiment
4.1 Information Processing System
4.2 Playback Device
4.3 Smart Speaker
4.4 Information Processing Method
5. Fourth Embodiment
5.1 Information Processing System
5.2 Playback Device
5.3 Smart Speaker
5.4 Information Processing Method
6. Fifth Embodiment
6.1 Information Processing System
6.2 Smart Speaker
6.3 Information Processing Method
7. Examples
7.1 First Example
7.2 Second Example
8. Summary
9. Hardware Configuration
10. Supplements 1. Background of Creation of Embodiments of Present Disclosure First, before describing the details of embodiments of the present disclosure, the background that led to the creation of the embodiment of the present disclosure by the present inventors will be described with reference to FIGS. 1 and 2. FIG. 1 is an explanatory diagram explaining a configuration example of an information processing system according to an embodiment of the present disclosure, and FIG. 2 is an explanatory diagram for explaining the embodiment of the present disclosure.

As described above, speech recognition technology has evolved, and smart speakers, which recognize uttered speech including a trigger word uttered by a user and perform a predetermined operation depending on a recognition result, are widespread. For example, as illustrated in FIG. 1, it is based on the premise that an information processing system includes a TV (playback device) 10 and a smart speaker (information processing device) 20. Note that details of the information processing system according to the embodiment of the present disclosure will be described later.

In such a case, as described above, there are cases where the smart speaker 20 recognizes, instead of uttered speech of a user 40, reproduction audio output from the TV 10 and causes erroneous operation not intended by the user 40, such as performing a predetermined operation depending on a recognition result of the reproduction audio. For example, in a case where the smart speaker 20 is set so as to be activated by a trigger word, the smart speaker 20 may be activated in response to the trigger word included in reproduction audio output by the TV 10. That is, it may be difficult for the smart speaker 20 to distinguish between the speech of the user 40 and the audio output from the TV 10. Furthermore, in such a case, the smart speaker 20 causes erroneous operation not intended by the user 40 since the smart speaker 20 responds to the trigger word included in the reproduction audio output from the TV 10 instead of speech of the user 40. In particular, in a case where the smart speaker 20 is incorporated in, for example, an autonomous driving system that performs autonomous driving of an automobile, it is conceivable that such erroneous operation develops into a serious issue.

Therefore, in order to avoid erroneous operation as described above, the following method is used in the related art. For example, as one of such methods, a plurality of microphones (hereinafter, referred to as a microphone) (not illustrated) is installed around the user 40. Then, in the method, the smart speaker 20 performs audio processing of canceling the noise of the ambient environmental sound from the sound collected by a plurality of microphones, thereby improving a signal-to-noise (S/N) ratio of uttered speech of the user 40. As a result, in the method, the S/N ratio of the uttered speech of the user 40 is improved, and thus, the smart speaker 20 can easily distinguish the uttered speech of the user 40 and the reproduction audio output from the TV 10 by the speech recognition and can avoid erroneous operation. Furthermore, in the method, the accuracy of speech recognition of the smart speaker 20 may be further improved so as to enable recognition of uttered speech of a specific user 40 and to thereby improve the accuracy of distinguishing the uttered speech of the specific user 40 from the reproduction audio output by the TV 10.

In addition, as another method, there is a method that can be applied to cases of simultaneous broadcasting such as television broadcasting. In the case of simultaneous broadcasting, the same audio is output from a plurality of TVs 10 at the same timing. Therefore, in this method, such output of the same audio at the same timing is detected by a cloud server (not illustrated) or the like, and the detection result is output to the smart speaker 20. Then, since the smart speaker 20 can distinguish between the uttered speech of the user 40 and the reproduction audio output by the TV 10 on the basis of the detection result from the cloud server, it is possible to avoid erroneous operation.

However, in a case of adopting the above method, it is difficult to avoid an increase in the cost of system construction due to the necessity of installing a plurality of microphones or the necessity of further improving the speech recognition accuracy of the smart speaker 20. Moreover, in a case where the above noise canceling processing of canceling the noise of the ambient environmental sound is adopted, in a case where sound that has been subjected to such processing is also output to the user, there is a possibility that the user feels fatigue, dizziness, or a headache. Furthermore, in on-demand streaming type distribution instead of the simultaneous broadcasting, it is not possible to detect output of the same audio at the same timing by a cloud server or the like, and thus it is not possible to distinguish between the uttered speech of the user 40 and the reproduction audio output from the TV 10 by the above method.

Therefore, the present inventors have elaborated embodiments of the present disclosure which will be described below in order to ensure that the smart speaker 20 does not respond to the reproduction audio of the TV 10 but responds only to the uttered speech of the user 40 present in the vicinity of the smart speaker 20 and does not cause erroneous operation not intended by the user 40.

In the embodiments of the present disclosure elaborated by the present inventors, the smart speaker 20 can distinguish between the uttered speech of the user 40 and the reproduction audio output by the TV 10 by detecting predetermined noise that cannot be uttered by human vocal cords superimposed on the reproduction audio reproduced by the TV 10. Furthermore, in the present embodiments, the smart speaker 20 can also distinguish between the uttered speech of the user 40 and the reproduction audio output by the TV 10 by detecting an echo superimposed on the uttered speech of the user 40. As a result, in the present embodiments, the smart speaker 20 responds only to the uttered speech of the user 40 and does not respond to the reproduction audio of the TV 10, and thus erroneous operation not intended by the user 40 does not occur.

More specifically, in the example in which predetermined noise is superimposed on the reproduction audio of the TV 10, even in a case where the smart speaker 20 has an advanced speech recognition function, the accuracy of speech recognition is deteriorated due to the superimposition of the predetermined noise. For example, a waveform obtained by synthesis in which noise illustrated in the lower left part of FIG. 2 is superimposed on the sound waveform of the original sound signal illustrated in the upper left part of FIG. 2 is illustrated in the central part of FIG. 2. In a case where such a synthesized waveform is collected by the smart speaker 20, the smart speaker 20 performs processing of separating the sound waveform for speech recognition; however, it is difficult to separate the sound waveform with high accuracy. Furthermore, even in a case where the sound waveform can be separated, the smart speaker 20 acquires a sound waveform including errors, not a sound waveform identical to the original sound signal, as illustrated on the right side of FIG. 2. Therefore, the smart speaker 20 analyzes the sound waveform including the errors, and thus the accuracy of speech recognition is deteriorated. That is, even in a case where the smart speaker 20 has an advanced speech recognition function, the accuracy of speech recognition is deteriorated due to superimposition of predetermined noise, and thus it becomes difficult to perform speech recognition. This makes it possible for the smart speaker 20 to detect that the predetermined noise is superimposed on the collected sound due to the fact that the speech recognition becomes difficult, and as a result, the smart speaker 20 can recognize that the sound on which the predetermined noise is superimposed is the reproduction audio from a playback device such as the TV 10 and can distinguish between the uttered speech of the user 40 and the reproduction audio output by the TV 10.

Meanwhile, in the case of the human hearing, even when predetermined noise is superimposed on the reproduction audio, the reproduction audio can be recognized since the function of speaker recognition is high unlike mechanical speech recognition as in the smart speaker 20. In detail, since the human hearing has a cocktail-party effect in which only the uttered speech of a conversation partner can be intensively heard even in a noisy environment, it is possible to recognize the reproduction audio even in a case where predetermined noise is superimposed. Hereinafter, details of embodiments of the present disclosure elaborated by the present inventors will be described in order.

2. First Embodiment

First, a first embodiment of the present disclosure in which predetermined noise is superimposed on reproduction audio on the playback device 10 side will be described.

2.1 Information Processing System

First, a configuration example of an information processing system according to the first embodiment of the present disclosure will be described with reference to FIGS. 1 and 2. As illustrated in FIG. 1, the information processing system according to the present embodiment can include, for example, the playback device 10 capable of reproducing content such as a television video and the smart speaker (information processing device) 20 that executes various tasks in response to speech input from the user 40. Note that the playback device 10 and the smart speaker 20 may communicate with each other via various wired or wireless communication networks. Furthermore, the number of the playback devices 10 and the smart speakers 20 included in the information processing system according to the present embodiment is not limited to the number illustrated in FIG.

1 and may be more. Hereinafter, an outline of each device included in the information processing system according to the present embodiment will be described.

(Playback Device 10)

The playback device 10 can reproduce content including at least sound, such as a moving image or music, and output the content to the user 40 or the like. For example, the playback device 10 can be a TV, a projector, a speaker, a music player, an in-vehicle audio visual (AV) device, a smartphone, or the like. In the present embodiment, the playback device 10 can perform audio processing of superimposing predetermined noise on sound to be reproduced as content and output the reproduction audio having been subjected to the audio processing to the user 40 or the like. Note that the detailed configuration of the playback device 10 will be described later.

(Smart Speaker 20)

The smart speaker 20 can execute various tasks on the basis of, for example, a trigger word included in uttered speech from the user 40 and a command subsequent to the trigger word. In the present embodiment, the smart speaker 20 is not particularly limited as long as it can execute various tasks on the basis of an instruction by speech input. For example, the smart speaker 20 may be a general-purpose personal computer (PC), a tablet terminal, a game machine, a mobile phone such as a smartphone, a portable music player, a speaker, a projector, a wearable device such as a head mounted display (HMD) or a smart watch, an in-vehicle device (autonomous driving navigation device or the like), a robot (for example, a humanoid robot or an autonomous driving car), or the like. Note that in FIG. 1, as an example, the smart speaker 20 that is a speaker type home agent that can be installed at home or the like is illustrated.

Furthermore, in the present embodiment, the smart speaker 20 detects, from the collected sound, audio processing superimposed on the sound by the playback device 10 and specifies an utterance subject of the sound on the basis of the audio processing that has been detected. Furthermore, the smart speaker 20 can determine whether or not the command included in the speech can be executed on the basis of the specification result. Note that the detailed configuration of the smart speaker 20 will be described later.

2.2 Playback Device

Figure 3:
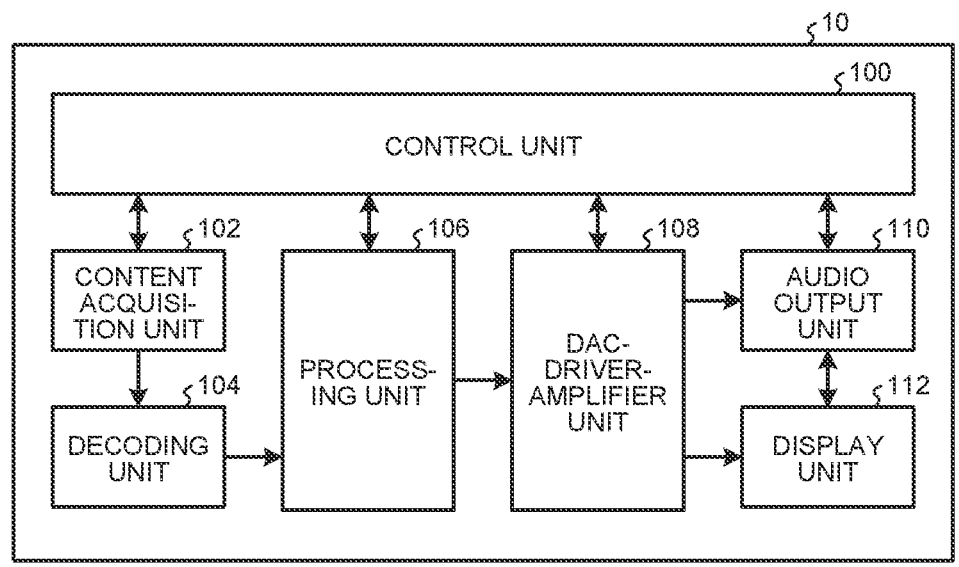
FIG. 3 is a block diagram illustrating a configuration example of a playback device according to a first embodiment of the present disclosure.

Next, the detailed configuration of the playback device 10 according to the present embodiment will be described with reference to FIG. 3. FIG. 3 is a block diagram illustrating a configuration example of the playback device 10 according to the present embodiment. Specifically, as illustrated in FIG. 3, the playback device 10 mainly includes a control unit 100, a content acquisition unit 102, a decoding unit 104, a processing unit 106, a digital analog converter (DAC)-driver-amplifier unit 108, an audio output unit (output unit) 110, and a display unit 112. Hereinafter, each functional block of the playback device 10 will be described in order.

(Control Unit 100)

The control unit 100 can integrally control the operation of the playback device 10 and is implemented by a processing circuit or the like such as a central processing unit (CPU) or a graphics processing unit (GPU).

(Content Acquisition Unit 102)

The content acquisition unit 102 can acquire content data related to a moving image or the like via, for example, a communication unit (not illustrated) or the like and can output the content data that has been acquired to the decoding unit 104 to be described later. Note that the content data may be stored in advance in a storage unit (not illustrated) included in the playback device 10. In this case, the storage unit may be included in the playback device 10 so as to be fixed therein or may be detachably provided to the playback device 10.

(Decoding Unit 104)

The decoding unit 104 decodes the content data acquired from the content acquisition unit 102, acquires a moving image or the like, and outputs the moving image or the like that has been acquired to the processing unit 106 to be described later.

(Processing Unit 106)

The processing unit 106 can perform audio processing of superimposing predetermined noise (digital watermark for audio signals) such as white noise on reproduction audio included in the moving image decoded by the decoding unit 104. In the present embodiment, the predetermined noise is not limited to white noise and may be a mosquito sound (high-frequency sound) having a high frequency, a low-frequency sound having a low frequency, a simple sound such as a beep, another sound (for example, an utterance of "a, i, u, e, o") irrelevant to the reproduction audio, or the like. Since it is difficult for the human hearing to recognize these noises, the human hearing can recognize the reproduction audio without being disturbed by these noises even when these noises are superimposed on the reproduction audio. Note that, in the present embodiment, since the high-frequency sound among the predetermined noises is likely to be greatly attenuated when transmitted by the air, it is preferable that the detection performance of the high-frequency sound of a detection unit 204 (see FIG. 4), which will be described later, is set high in the smart speaker 20.

(DAC-Driver-Amplifier Unit 108)

The DAC-driver-amplifier unit 108 includes a digital-to-analog converter, a driver, an amplifier, and the like and can convert the moving image acquired from the processing unit 106 into an analog format, amplify the moving image, and output the moving image to the audio output unit 110 and the display unit 112 to be described later.

(Audio Output Unit 110)

The audio output unit 110 includes, for example, a speaker, a headphone, or the like and can output the reproduction audio having been subjected to the audio processing that has been acquired from the DAC-driver-amplifier unit 108 to the outside. Note that the audio output unit 110 may be included in the playback device 10 so as to be fixed therein or may be detachably provided to the playback device 10.

(Display Unit 112)

The display unit 112 includes, for example, a liquid crystal display (LCD), an organic electro luminescence (EL) display, or the like and can output the reproduction image acquired from the DAC-driver-amplifier unit 108. Note that, in the present embodiment, the display unit 112 may not be included. Meanwhile, the display unit 112 may be included in the playback device 10 so as to be fixed therein or may be detachably provided to the playback device 10.

2.3 Smart Speaker

Figure 4:
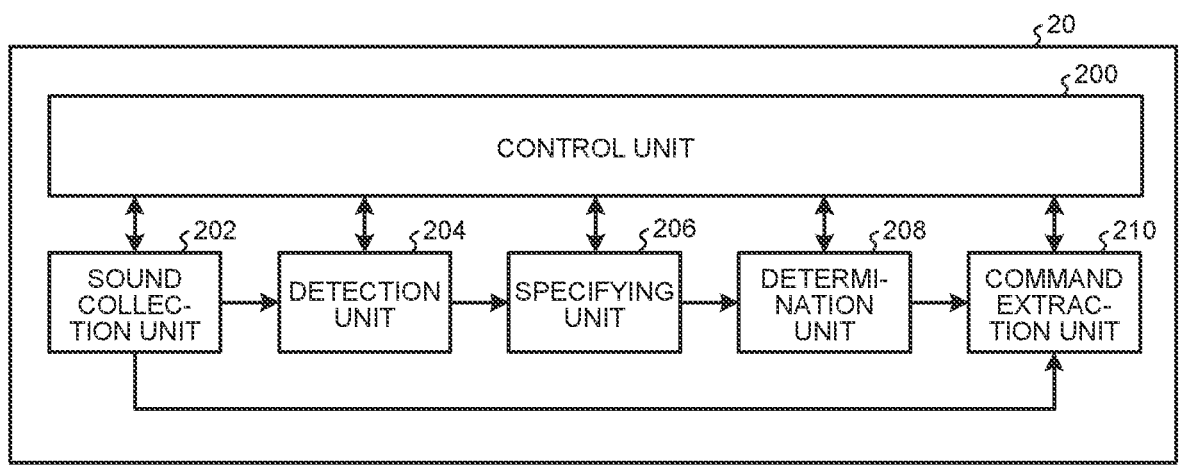
FIG. 4 is a block diagram illustrating a configuration example of a smart speaker according to the embodiment.

Next, the detailed configuration of the smart speaker 20 according to the present embodiment will be described with reference to FIG. 4. FIG. 4 is a block diagram illustrating a configuration example of the smart speaker 20 according to the present embodiment. Specifically, as illustrated in FIG. 4, the smart speaker 20 mainly includes a control unit 200, a sound collection unit 202, a detection unit (first detection unit) 204, a specifying unit 206, a determination unit 208, and a command extraction unit 210. Hereinafter, each functional block of the smart speaker 20 will be described in order.

(Control Unit 200)

The control unit 200 can integrally control the operation of the smart speaker 20 and is implemented by, for example, a processing circuit such as a CPU or a GPU.

(Sound Collection Unit 202)

The sound collection unit 202 is a microphone capable of acquiring uttered speech of the user 40 and environmental sound around the user 40 (for example, reproduction audio from the playback device 10). For example, the sound collection unit 202 can receive command input from the user 40 to the smart speaker 20 by acquiring a command included in the uttered speech of the user 40. Note that the sound collection unit 202 may be included in the smart speaker 20 so as to be fixed therein or may be detachably provided to the smart speaker 20.

(Detection Unit 204)

The detection unit 204 can detect audio processing such as predetermined noise superimposed on the sound by the playback device 10 from the sound collected by the sound collection unit 202. Specifically, the detection unit 204 may directly detect the predetermined noise or may perform sound analysis on the sound collected by the sound collection unit 202 and indirectly detect that the predetermined noise is superimposed when the speech recognition cannot be performed.

(Specifying Unit 206)

The specifying unit 206 can specify the utterance subject of the speech on the basis of the audio processing detected by the detection unit 204. That is, the specifying unit 206 distinguishes between the uttered speech of the user 40 and the reproduction audio output by the playback device 10 on the basis of the detection result of the presence or absence of the superimposition of the predetermined noise in the detection unit 204.

(Determination Unit 208)

The determination unit 208 can determine whether or not to execute the command included in the speech on the basis of the specification result of the specifying unit 206. Specifically, based on the specification result of the specifying unit 206, the determination unit 208 performs determination so as to respond only to the command included in the uttered speech of the user 40 and not to a command included in the reproduction audio of the playback device 10. As a result, in the present embodiment, the smart speaker 20 does not cause erroneous operation not intended by the user 40.

More specifically, in a case where the detection unit 204 detects that the predetermined noise is superimposed on the sound as the audio processing, the specifying unit 206 specifies that the utterance subject of the sound is the playback device 10, that is, that the sound has been reproduced by the playback device 10, and the determination unit 208 determines not to execute the command included in the sound on the basis of the specification result. On the other hand, in a case where the detection unit 204 detects that the predetermined noise is not superimposed on the sound as the audio processing, the specifying unit 206 specifies that the utterance subject of the sound is the user (predetermined user) 40, that is, that the sound has been uttered by the user 40, and the determination unit 208 determines to execute the command included in the sound on the basis of the specification result.

(Command Extraction Unit 210)

In a case where the determination unit 208 determines to execute the command, the command extraction unit 210 performs speech recognition on the sound collected by the sound collection unit 202 and extracts words related to, for example, a trigger word and a subsequent command. Furthermore, the control unit 200 controls the operation of the smart speaker 20 in accordance with the command that has been extracted and executes a task related to the command. Note that, in the present embodiment, performing the above speech recognition is not limited to the command extraction unit 210 of the smart speaker 20 and may be performed by a cloud server (not illustrated) on the Internet as long as the smart speaker 20 can be connected to the Internet.

2.4 Information Processing Method

Figure 5:
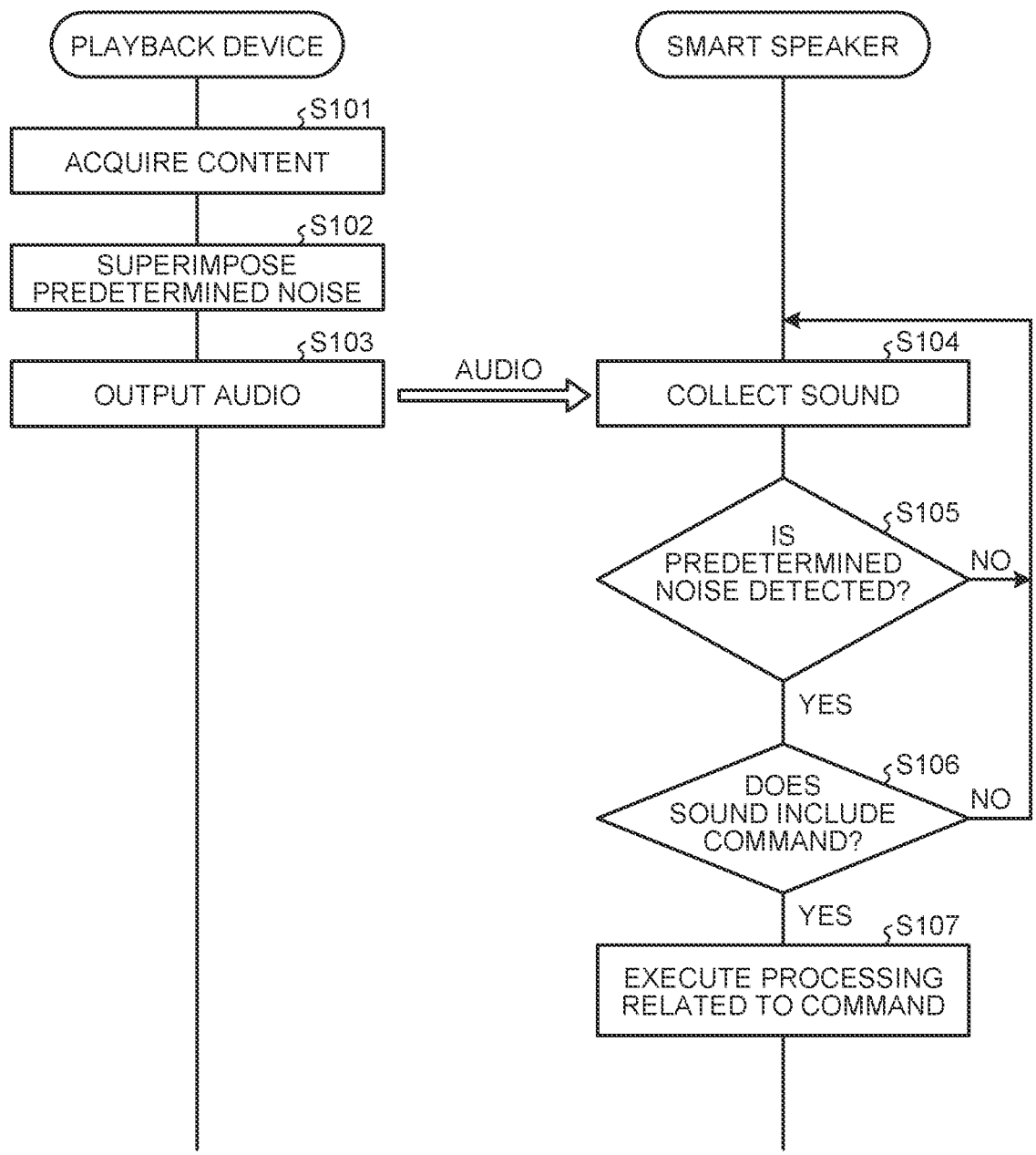
FIG. 5 is a sequence diagram explaining an example of an information processing method according to the embodiment.

Next, an information processing method according to the first embodiment of the present disclosure will be described with reference to FIG. 5. FIG. 5 is a sequence diagram illustrating an example of the information processing method according to the present embodiment. Specifically, as illustrated in FIG. 5, the information processing method according to the present embodiment can include steps from step S101 to step S107. Details of these steps according to the present embodiment will be described below.

The playback device 10 acquires content data such as a moving image to be reproduced (step S101). Next, the playback device 10 performs processing of superimposing predetermined noise on reproduction audio included in the content data acquired in step S101 (step S102). Then, the playback device 10 outputs the reproduction audio on which the predetermined noise is superimposed, an image, and the like to the user 40 (step S103).

The smart speaker 20 collects the reproduction audio output from the playback device 10 (step S104). Next, the smart speaker 20 determines whether or not the predetermined noise has been detected from the sound collected in step S104 (step S105). The smart speaker 20 proceeds to step S106 if the predetermined noise is not detected (step S105: Yes) and returns to step S104 described above if the predetermined noise is detected (step S105: No). Then, the smart speaker 20 determines whether or not a predetermined command is included in the reproduction audio that has been collected (step S106). If a predetermined command is included (step S106: Yes), the smart speaker 20 proceeds to step S107, and if not (step S106: No), the process returns to step S104 described above.

The smart speaker 20 executes the task related to the command that has been determined to be included in step S106 and ends the processing (step S107).

As described above, in the present embodiment, in a case where the predetermined noise is superimposed on the reproduction audio on the playback device 10 side, even when a command is included in the reproduction audio, the smart speaker 20 does not respond to the command in response to detection of the predetermined noise.

As described above, according to the present embodiment, the smart speaker 20 can distinguish between the uttered speech of the user 40 and the reproduction audio output by the playback device 10 by detecting the predetermined noise superimposed on the reproduction audio. As a result, in the present embodiment, the smart speaker 20 responds only to the uttered speech of the user 40 and does not respond to the reproduction audio of the playback device 10, and thus erroneous operation not intended by the user 40 does not occur.

Furthermore, according to the present embodiment, since the sense of hearing of the user 40 can recognize the reproduction audio even when the predetermined noise is superimposed on the reproduction audio, it does not hinder the appreciation of the reproduction audio by the user 40.

3. Second Embodiment

Meanwhile, in the first embodiment described above, even in a case where the smart speaker 20 is not present nearby, the playback device 10 performs the processing of superimposing predetermined noise on reproduction audio. As a result, in the first embodiment, the processing load in the playback device 10 may increase. Therefore, in a second embodiment of the present disclosure described below, only in a case where the smart speaker 20 is present near the playback device 10, the playback device 10 performs the processing of superimposing the predetermined noise on the reproduction audio. With this configuration, in the present embodiment, it is possible to suppress an increase in the processing load in the playback device 10. Hereinafter, details of the present embodiment will be described.

3.1 Information Processing System

Since the configuration example of the information processing system according to the present embodiment is in common with that of the information processing system of the first embodiment, FIG. 1 used in the explanation and description of the configuration of the information processing system according to the first embodiment can be referred to. Therefore, the description of the information processing system according to the present embodiment is omitted here.

3.2 Playback Device

Figure 6:
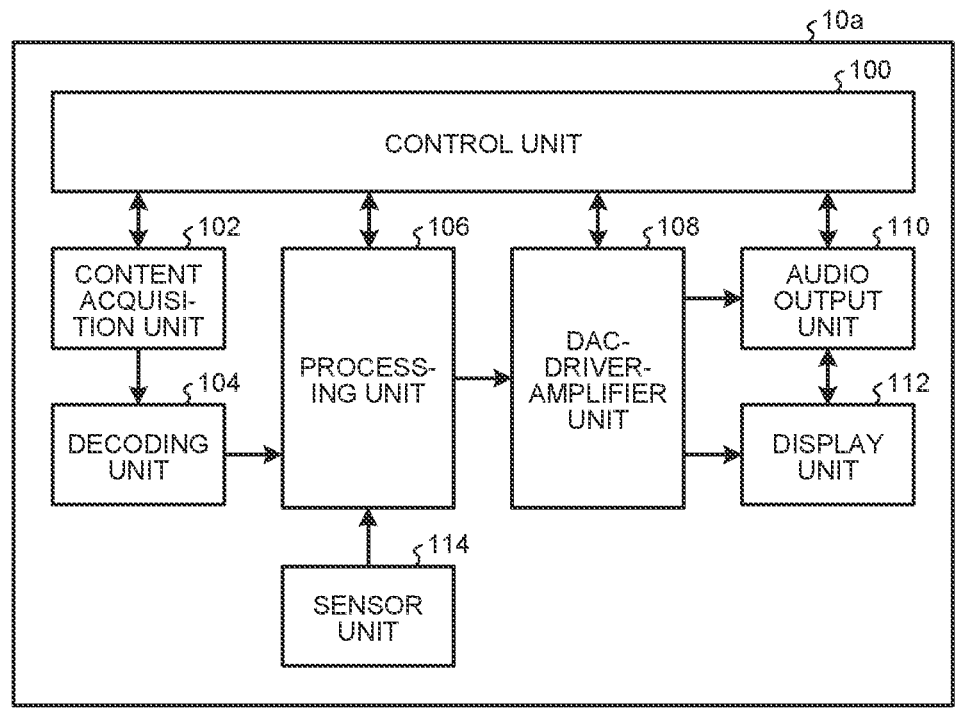
FIG. 6 is a block diagram illustrating a configuration example of a playback device according to a second embodiment of the present disclosure.

Next, the detailed configuration of a playback device 10*a* according to the present embodiment will be described with reference to FIG. 6. FIG. 6 is a block diagram illustrating a configuration example of the playback device 10*a* according to the present embodiment. Specifically, as illustrated in FIG. 6, the playback device 10*a* mainly includes a control unit 100, a content acquisition unit 102, a decoding unit 104, a processing unit 106, a DAC-driver-amplifier unit 108, an audio output unit (output unit) 110, a display unit 112, and, in addition, a sensor unit (third detection unit) 114. Hereinafter, each of the functional units of the playback device 10*a* will be described in order. However, since components other than the sensor unit 114 are in common with the functional units of the playback device 10 according to the first embodiment, description of components other than the sensor unit 114 will be omitted, and only the sensor unit 114 will be described below.

(Sensor Unit 114)

The sensor unit 114 detects that the smart speaker 20 is present within a predetermined distance from the playback device 10*a*. In the present embodiment, it is based on the premise that the predetermined distance is, for example, a distance at which the playback device 10*a* and the smart speaker 20 can be wirelessly connected in the same network from the viewpoint of network topology or a distance at which wireless connection to each other via several relay stations is possible. Specifically, a sensor unit 144 can detect the presence of the smart speaker 20 using zero configuration networking (Zeroconf) or the like using technology such as Universal Plug and Play (UPnP) or Bonjour. In the present embodiment, in a case where the sensor unit 144 detects that the smart speaker 20 is present within a predetermined distance, the processing unit 106 described above performs audio processing of superimposing predetermined noise on the reproduction audio. Note that the detection of the presence of the smart speaker 20 within the predetermined distance by the sensor unit 144 is not limited to the above methods. For example, a positioning device such as a global navigation satellite system (GNSS) receiver may be provided to the playback device 10*a* and the smart speaker 20, and the detection may be performed by positioning information.

3.3 Smart Speaker

Since the configuration example of the smart speaker 20 according to the present embodiment is in common with the smart speaker 20 of the first embodiment, it is possible to refer to the description of the configuration of the smart speaker 20 according to the first embodiment and FIG. 4 used in the description. Therefore, the description of the smart speaker 20 according to the present embodiment is omitted here.

3.4 Information Processing Method

An information processing method according to the present embodiment is in common with the information processing method of the first embodiment except that the audio processing of superimposing the predetermined noise is performed on reproduction audio when the playback device 10*a* detects that the smart speaker 20 is present within the predetermined distance from the playback device 10*a*, and thus the description of the information processing method of the first embodiment and FIG. 5 used in the description can be referred to. Therefore, the description of the information processing method according to the present embodiment is omitted here.

As described above, in the present embodiment, only in a case where the smart speaker 20 is present near the playback device 10*a*, the playback device 10*a* performs the processing of superimposing the predetermined noise on the reproduction audio, and thus it is possible to suppress an increase in the processing load of the playback device 10*a*.

4. Third Embodiment

Meanwhile, the task of the smart speaker 20 is executed in a case where the smart speaker 20 detects a trigger word and a command subsequent to the trigger word from collected sound. That is, the smart speaker 20 does not execute any task unless a trigger word and a command subsequent to the trigger word are detected. Therefore, in a case where erroneous operation is to be avoided, it is only required that the smart speaker 20 be not able to perform speech recognition on a command subsequent to a trigger word in the reproduction audio from the playback device 10. Therefore, in the third embodiment of the present disclosure described below, the playback device 10 performs the processing of superimposing the predetermined noise on reproduction audio following a trigger word by using detection of the trigger word from the reproduction audio as a trigger. Therefore, the smart speaker 20 cannot recognize the reproduction audio subsequent to the trigger word since the predetermined noise is superimposed and thus does not respond to the command even when a command is included in the reproduction audio. With this configuration, in the present embodiment, the audio processing of superimposing the predetermined noise is performed when a trigger word is detected, and thus it is possible to suppress an increase in the load of the audio processing in the playback device 10. Hereinafter, details of the present embodiment will be described in order.

4.1 Information Processing System

Since the configuration example of the information processing system according to the present embodiment is in common with that of the information processing system of the first embodiment, FIG. 1 used in the explanation and description of the configuration of the information processing system according to the first embodiment can be referred to. Therefore, the description of the information processing system according to the present embodiment is omitted here.

4.2 Playback Device

Figure 7:
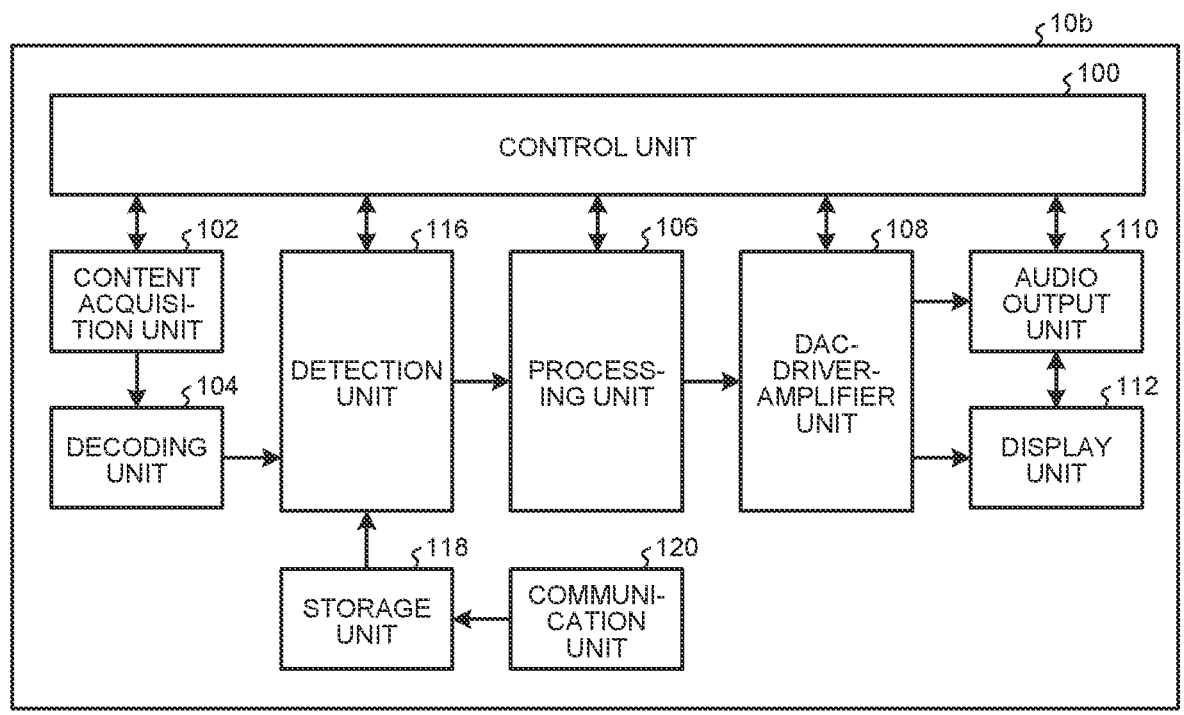
FIG. 7 is a block diagram illustrating a configuration example of a playback device according to a third embodiment of the present disclosure.

Next, the detailed configuration of a playback device 10*b* according to the present embodiment will be described with reference to FIG. 7. FIG. 7 is a block diagram illustrating a configuration example of the playback device 10*b* according to the present embodiment. Specifically, as illustrated in FIG. 7, the playback device 10*b* mainly includes a control unit 100, a content acquisition unit 102, a decoding unit 104, a processing unit 106, a DAC-driver-amplifier unit 108, an audio output unit (output unit) 110, a display unit 112, and, in addition, a detection unit (second detection unit) 116, a storage unit 118, and a communication unit 120. Hereinafter, each of the functional units of the playback device 10*b* will be described in order. However, since components other than the detection unit 116, the storage unit 118, and the communication unit 120 are in common with the functional units of the playback device 10 according to the first embodiment, description of components other than the detection unit 116, the storage unit 118, and the communication unit 120 will be omitted below.

(Detection Unit 116)

The detection unit 116 can detect that a trigger word (predetermined word) is included in reproduction audio. In other words, the detection unit 116 can constantly monitor whether or not a trigger word is included in reproduction audio to be reproduced. More specifically, the detection unit 116 can perform the detection by performing sound analysis on the reproduction audio and depending on whether or not a word related to the trigger word can be extracted from the reproduction audio. Note that, in the present embodiment, it is based on the premise that the trigger word is stored in advance in the storage unit 118 to be described later. Moreover, in the present embodiment, in a case where the detection unit 116 detects that the trigger word is included in the reproduction audio, the processing unit 106 performs audio processing of superimposing the predetermined noise on reproduction audio reproduced after the trigger word. Note that, in the present embodiment, the processing unit 106 can perform audio processing on the reproduction audio, for example, after the trigger word to a pause (mute) of the reproduction audio; however, it is not limited thereto. For example, in the present embodiment, the processing unit 106 may perform audio processing on the reproduction audio after the trigger word until a predetermined time elapses.

Furthermore, in the present embodiment, the above sound analysis is not limited to being performed by the detection unit 116 of the playback device 10*b* and may be performed by a cloud server (not illustrated) on the Internet as long as the playback device 10*b* can be connected to the Internet.

(Storage Unit 118)

The storage unit 118 stores programs, information, and the like for the control unit 100 to execute various types of processing and information obtained by the processing. The storage unit 118 also stores, for example, information of the trigger word used by the detection unit 116 (for example, word data text) described above. Note that the storage unit 118 is implemented by, for example, a storage device such as a hard disk drive (HDD).

(Communication Unit 120)

The communication unit 120 can transmit and receive information to and from an external device such as the smart speaker 20. In other words, the communication unit 120 can be referred to as a communication interface having a function of transmitting and receiving data. In the present embodiment, the communication unit 120 receives information of the trigger word from the smart speaker 20 and outputs the received information to the storage unit 118 described above. Note that the communication unit 120 is implemented by a communication device such as a communication antenna, a transmission and reception circuit, or a port.

Note that, in the present embodiment, in a case where the playback device 10*b* does not include the communication unit 120, the trigger word may be input to the storage unit 118 in advance by manual input or the like.

4.3 Smart Speaker

Since the configuration example of the smart speaker 20 according to the present embodiment is in common with the smart speaker 20 of the first embodiment, it is possible to refer to the description of the configuration of the smart speaker 20 of the first embodiment and FIG. 4 used in the description. Therefore, the description of the smart speaker 20 according to the present embodiment is omitted here.

4.4 Information Processing Method

Figure 8:
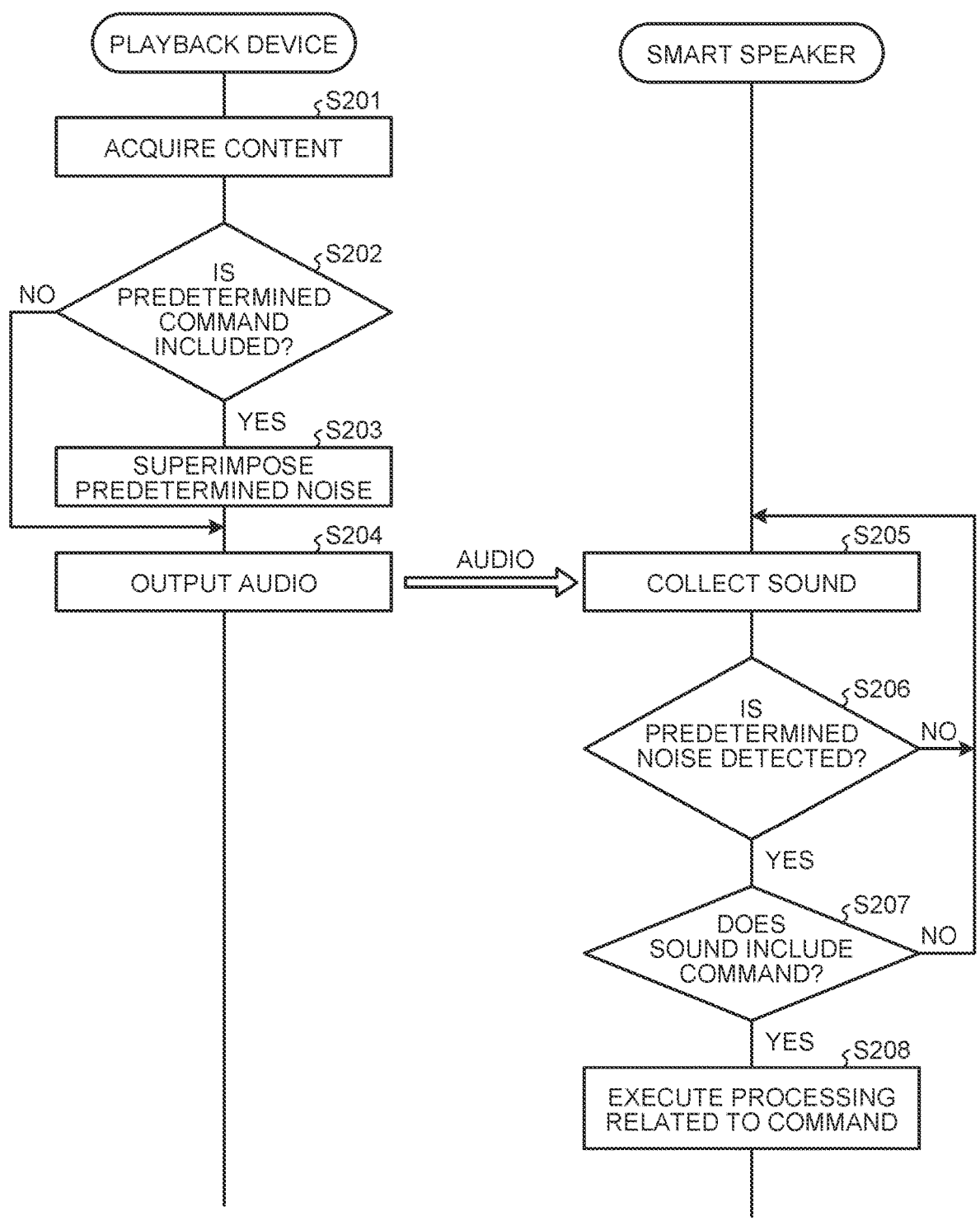
FIG. 8 is a sequence diagram explaining an example of an information processing method according to the embodiment.

Next, an information processing method according to the third embodiment of the present disclosure will be described with reference to FIG. 8. FIG. 8 is a sequence diagram illustrating an example of the information processing method according to the present embodiment. Specifically, as illustrated in FIG. 8, the information processing method according to the present embodiment can mainly include steps from step S201 to step S208. Details of these steps according to the present embodiment will be described below.

First, the playback device 10*b* acquires content data such as a moving image to be reproduced, similarly to step S101 of the first embodiment illustrated in FIG. 5 (step S201). Next, the playback device 10*b* detects whether or not a trigger word (predetermined word) is included in reproduction audio included in the content data acquired in step S101 (step S202). If it is detected (step S202: Yes), the playback device 10*b* proceeds to step S203, and if it is not detected (step S202: No), the playback device 10*b* proceeds to step S204.

Then, the playback device 10*b* performs the processing of superimposing the predetermined noise on the sound after the trigger word of the reproduction audio included in the content data acquired in step S201 (step S203). Then, the playback device 10*b* outputs the reproduction audio on which the predetermined noise is superimposed or the reproduction audio on which the predetermined noise is not superimposed, the image, and the like to the user 40 (step S204).

Furthermore, since steps S205 to S208 illustrated in FIG. 8 are in common with steps S104 to S107 of the information processing according to the first embodiment illustrated in FIG. 5, the description of steps S205 to S208 is omitted here.

Also in the present embodiment, even in a case where a command subsequent to the trigger word is included in reproduction audio, the smart speaker 20 does not respond to the command in response to detection of the predetermined noise superimposed on the command.

As described above, according to the present embodiment, it is possible to distinguish between the uttered speech of the user 40 and the reproduction audio output by the playback device 10b. As a result, in the present embodiment, the smart speaker 20 responds not to a command subsequent to the trigger word included in the reproduction audio from the playback device 10b but to only a command subsequent to the trigger word included in uttered speech of the user 40, and thus erroneous operation not intended by the user 40 does not occur.

Furthermore, in the present embodiment, the playback device 10b performs the audio processing of superimposing the predetermined noise when the trigger word is detected, and thus it is possible to suppress an increase in the load of the audio processing in the playback device 10.

5. Fourth Embodiment

In the first to third embodiments described above, the example in which predetermined noise is superimposed on reproduction audio of the playback device 10 has been described. However, the present disclosure is not limited to such examples, and sound having a sound waveform similar to that of uttered speech of the user 40 may be superimposed as an echo on the uttered speech. In this case, by determining in advance the number of echoes superimposed on the uttered speech of the user 40, an echo delay time, and the like, the smart speaker 20 can recognize that the utterance subject is the user 40 on the basis of the number of echoes superimposed on uttered speech that has been detected and the echo delay time. Hereinafter, a fourth embodiment using such echoes will be described with reference to FIG. 9.

Figure 9:
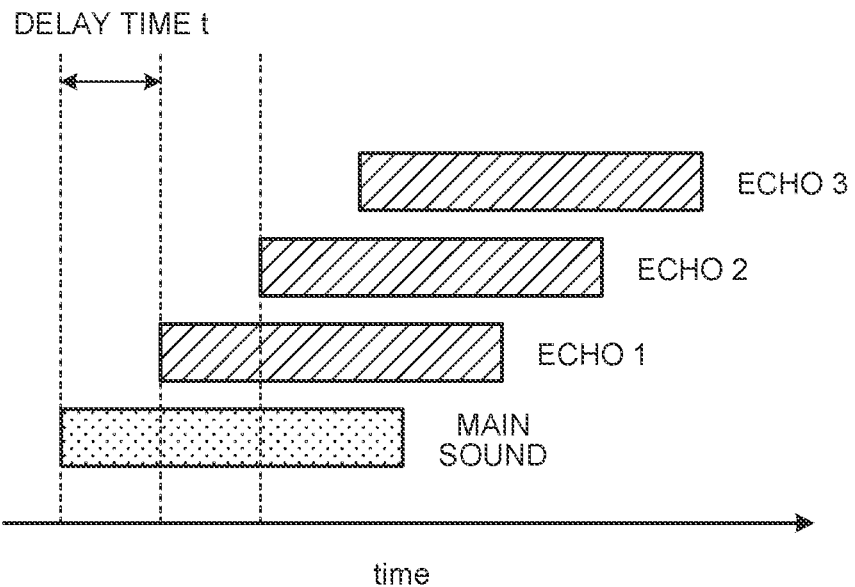
FIG. 9 is an explanatory diagram for explaining a fourth embodiment of the present disclosure.

Specifically, in the present embodiment, the playback device 10 acquires uttered speech of the user 40 as the main sound, and as illustrated in FIG. 9, generates a predetermined number of echoes by sequentially outputting the acquired main sound shifted by a predetermined delay time t. The smart speaker 20 detects that the sound is uttered speech of the user 40 by detecting, following the main sound, echoes having a predetermined delay time t or the predetermined number of echoes. Note that, in the present embodiment, the delay time t may not be constant, and a delay time t between the main sound and a following echo 1, a delay time between the echo 1 and a following echo 2, and a delay time between the echo 2 and a following echo 3 may be different and are not particularly limited.

Note that, in the present embodiment, the delay time t of an echo preferably has a length that cannot be recognized by the human hearing, that is, it is preferable that the length causes the human hearing to hear one sound in which the main sound and the echo are overlapped. Specifically, for example, the delay time t of an echo is preferably about from milliseconds to ten milliseconds, which is about the same level as the delay time that can occur in daily life as described below. With such setting, it is possible to avoid discomfort in the human hearing.

Specifically, the sound velocity V (m/s) in the air around the room temperature is expressed by the following equation (1).

$$V = 331.5 + 0.6a \quad (1)$$

Symbol a denotes the room temperature.

Therefore, according to the above equation (1), when the room temperature is 15° C., the sound velocity V is approximately 340 m/s.

Furthermore, in the case of a room temperature of 15° C., the relationship between the sound transmission distance L (m) in the air and the delay time T (s) is expressed by the following equation (2).

$$T = L/340 \quad (2)$$

For example, according to the above equation (2), the delay time T is about 30 milliseconds at a distance of about ten meters which corresponds to the size of a room of a typical house, the delay time T is about 3 milliseconds at a distance of about one meter which corresponds to a distance between people who are having a conversation face to face, and the delay time T is about 0.3 milliseconds at a distance of about 10 centimeters which corresponds to a distance between the mouth and a microphone attached close to the mouth.

That is, as can be seen from the above-described numerical example, a delay of about several milliseconds occurs in daily life, but such a delay does not cause a sense of discomfort in the human hearing. Therefore, in the present embodiment, for example, in a case where ten echoes having a delay time t of 0.3 milliseconds are superimposed, the longest delay time is 3 milliseconds. However, since this is within the range of the delay time experienced in daily life, a sense of discomfort does not occur in the human hearing.

Furthermore, in the present embodiment, by setting the different delay times t or different numbers of echoes to be superimposed for each person, the smart speaker 20 can specify uttered speech for each person from uttered speech of a plurality of persons that has been collected.

5.1 Information Processing System

Figure 10:
FIG. 10 is an explanatory diagram for explaining an example of the appearance of a microphone according to the embodiment.

The configuration example of an information processing system according to the present embodiment includes a playback device 10c (see FIG. 11) and a smart speaker 20a (see FIG. 11), similarly to the information processing system of the first embodiment. Furthermore, in the present embodiment, the playback device 10c can be, for example, a microphone 50 having an appearance as illustrated in FIG. 10, the microphone worn by the user 40. Note that FIG. 10 is an explanatory diagram for explaining an example of the appearance of the microphone 50 according to the present embodiment. Specifically, in the present embodiment, the microphone 50 is installed close to the mouth of the user 40, uttered speech of the user 40 is collected by the microphone 50, and an echo is generated and output on the basis of the uttered speech that has been collected. Note that the playback device 10c according to the present embodiment is not limited to the microphone 50 having the appearance as illustrated in FIG. 10 and may have another configuration and appearance as long as the configuration is capable of collecting uttered speech of the user 40.

<5.2 Playback Device>

Figure 11:
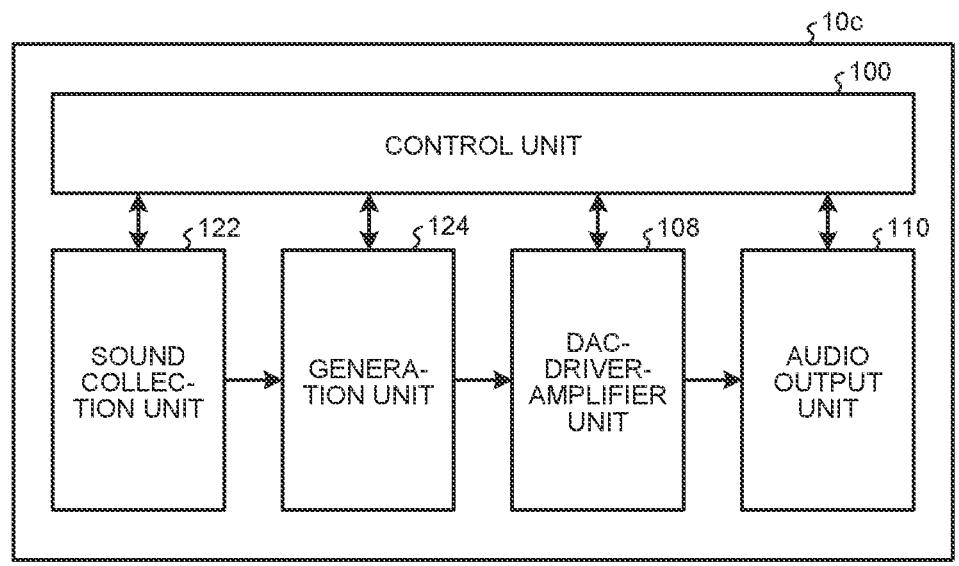
FIG. 11 is a block diagram illustrating a configuration example of a playback device according to the embodiment.

Next, the detailed configuration of the playback device 10c according to the present embodiment will be described with reference to FIG. 11. FIG. 11 is a block diagram illustrating a configuration example of the playback device 10c according to the present embodiment. Specifically, as illustrated in FIG. 11, the playback device 10c mainly includes a control unit 100, a DAC-driver-amplifier unit 108, an audio output unit (output unit) 110, and, in addition, a sound collection unit 122, and a generation unit 124. Hereinafter, each of the functional units of the playback device 10c will be described in order. However, since components other than the sound collection unit 122 and the generation unit 124 are in common with the functional units of the playback device 10 according to the first embodiment, description of components other than the sound collection unit 122 and the generation unit 124 will be omitted below.

(Sound Collection Unit 122)

The sound collection unit 122 can be worn by the user 40, collect an uttered speech of the user 40, and output the uttered speech to the generation unit 124 to be described later. Note that the sound collection unit 122 can be a microphone and may be included in the playback device 10c so as to be fixed therein or may be detachably provided to the playback device 10c.

(Generation Unit 124)

The generation unit 124 generates an echo by delaying the uttered speech collected by the sound collection unit 122 by a predetermined delay time t or by delaying by a predetermined number of times and outputs the echo(es) to the DAC-driver-amplifier unit 108. The echo that has been generated is output by the audio output unit 110.

5.3 Smart Speaker

Figure 12:
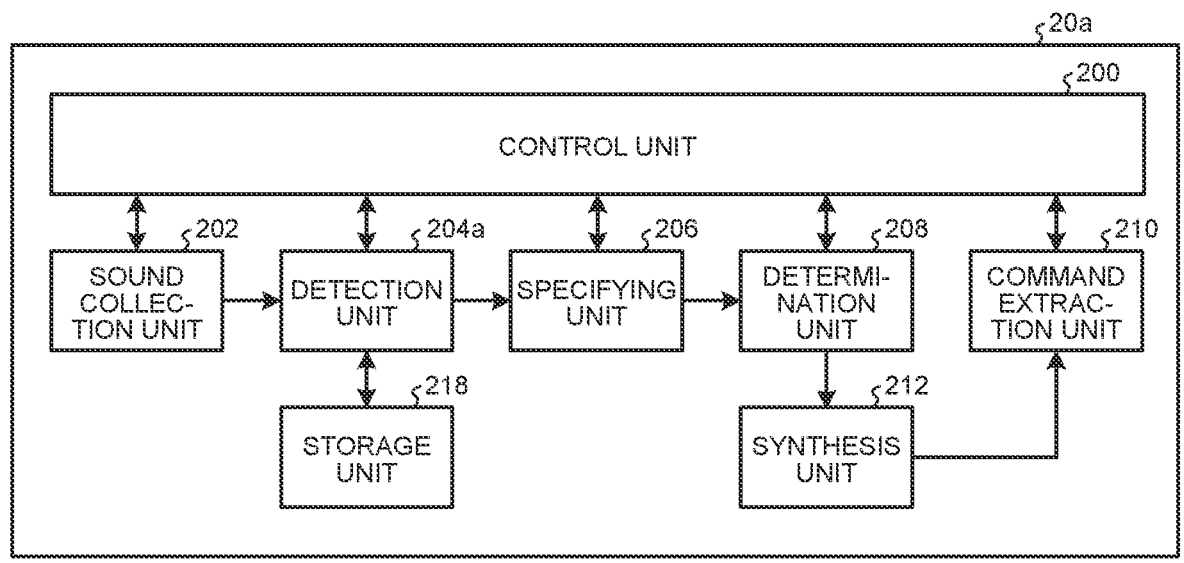
FIG. 12 is a block diagram illustrating a configuration example of a smart speaker according to the embodiment.
Figure 13:
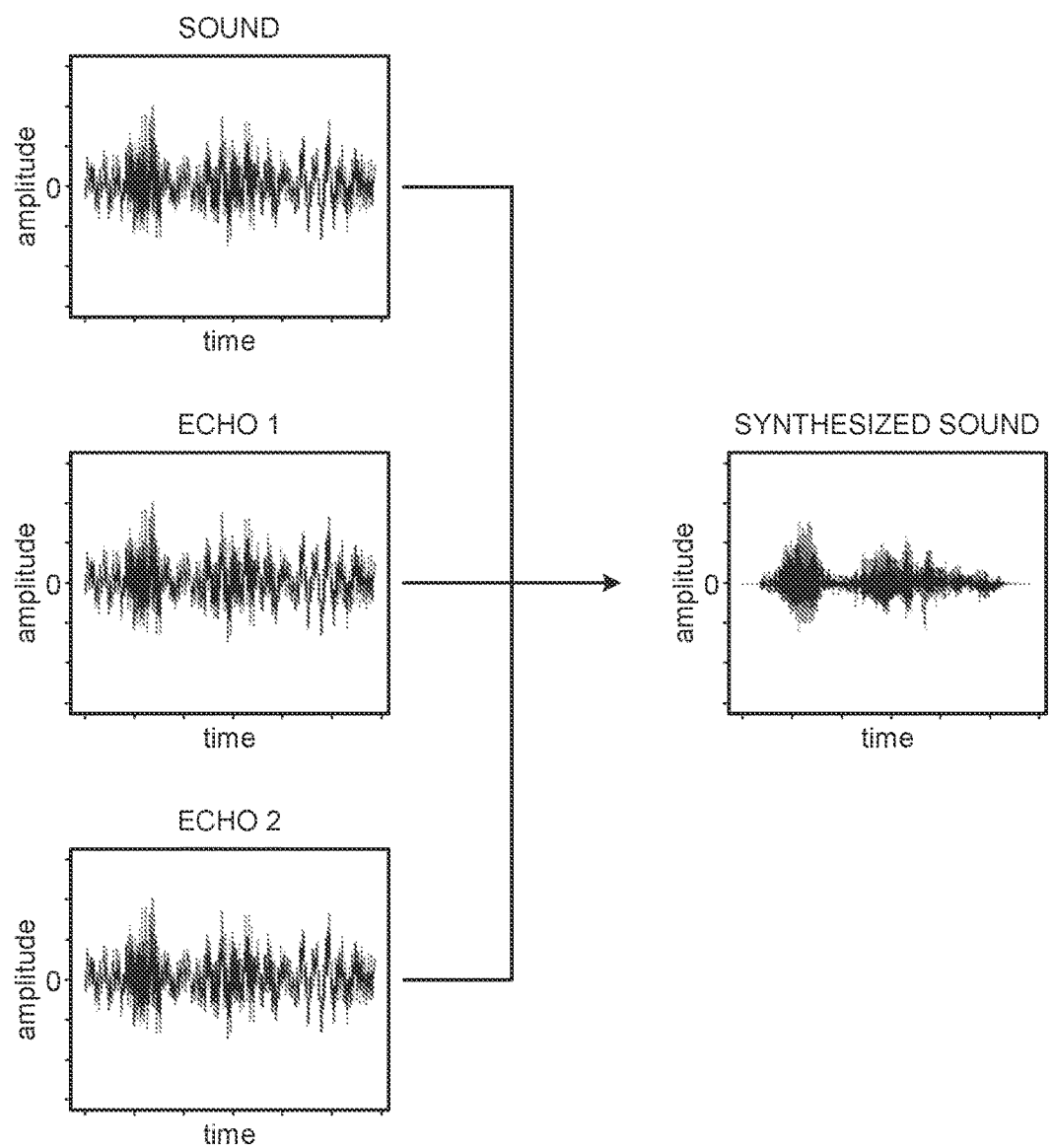
FIG. 13 is an explanatory diagram for explaining an example of processing in a synthesis unit in FIG. 12.

Next, the detailed configuration of the smart speaker 20a according to the present embodiment will be described with reference to FIGS. 12 and 13. FIG. 12 is a block diagram illustrating a configuration example of the smart speaker 20a according to the present embodiment. FIG. 13 is an explanatory diagram for explaining an example of processing in a synthesis unit 212 in FIG. 12.

Specifically, as illustrated in FIG. 12, the smart speaker 20a mainly includes a control unit 200, a sound collection unit 202, a detection unit (first detection unit) 204a, a specifying unit 206, a determination unit 208, a command extraction unit 210, and, in addition, a storage unit 218, and the synthesis unit 212. Hereinafter, each of the functional blocks of the smart speaker 20a will be described in order. However, since components other than the detection unit 204a, the storage unit 218, and the synthesis unit 212 are in common with the functional units of the smart speaker 20 according to the first embodiment, description of components other than the detection unit 204a, the storage unit 218, and the synthesis unit 212 will be omitted below.

(Detection Unit 204a)

The detection unit 204a performs sound analysis on the sound collected by the sound collection unit 202 and separates a predetermined sound waveform that appears first in the sound and a predetermined sound waveform that appears as an echo. Furthermore, the detection unit 204a can detect the number of echoes superimposed on the sound collected by the sound collection unit 202 or the delay time t of the echo. In the present embodiment, in a case where the detection unit 204a detects that the number of echoes superimposed on the sound is a predetermined number or that the delay time t of the echo is a predetermined time t by referring to data stored in the storage unit 218 to be described later, the specifying unit 206 specifies that the utterance subject of the sound is the user 40. Furthermore, as in the first embodiment, also in the present embodiment, the determination unit 208 determines to execute a command included in the sound on the basis of the specification result. Note that, in the present embodiment, performing the above sound analysis is not limited to the detection unit 204a of the smart speaker 20a and may be performed by a cloud server (not illustrated) on the Internet as long as the smart speaker 20a can be connected to the Internet.

(Storage Unit 218)

The storage unit 218 stores programs, information, and the like for the control unit 200 to execute various types of processing and information obtained by the processing. Furthermore, the storage unit 218 stores, for example, data used by the detection unit 204a (number of echoes related to the user 40, delay time t of an echo, and the like) described above. Note that the storage unit 218 is implemented by, for example, a storage device such as an HDD.

(Synthesis Unit 212)

The synthesis unit 212 performs sound analysis on the sound that has been collected and extracts a predetermined sound waveform (sound in FIG. 13) of the main sound that first appears in the sound that is illustrated in the upper left part of FIG. 13. Furthermore, the synthesis unit 212 performs sound analysis on the sound that has been collected and separates predetermined sound waveforms (echoes 1 and 2 in FIG. 13) that appear as echoes illustrated in the left center and lower left parts of FIG. 13. Then, the synthesis unit 212 overlaps and synthesizes the sound waveforms of the main sound that has been extracted and the echoes that have been separated and outputs a synthesized waveform (synthesized sound in FIG. 13) illustrated on the right side of FIG. 13 to the command extraction unit 210. In the present embodiment, since the superimposed echoes can be separated and synthesized by the synthesis unit 212, the S/N ratio of the uttered speech of the user 40 in the synthesized waveform can be improved. As a result, according to the present embodiment, the accuracy of speech recognition for uttered speech in the smart speaker 20a can be improved. Note that, in the present embodiment, the accuracy of speech recognition is improved more as the number of echoes superimposed is larger. Note that, in the present embodiment, performing the above sound analysis is not limited to the synthesis unit 212 of the smart speaker 20a and may be performed by a cloud server (not illustrated) on the Internet as long as the smart speaker 20a can be connected to the Internet.

5.4 Information Processing Method

Figure 14:
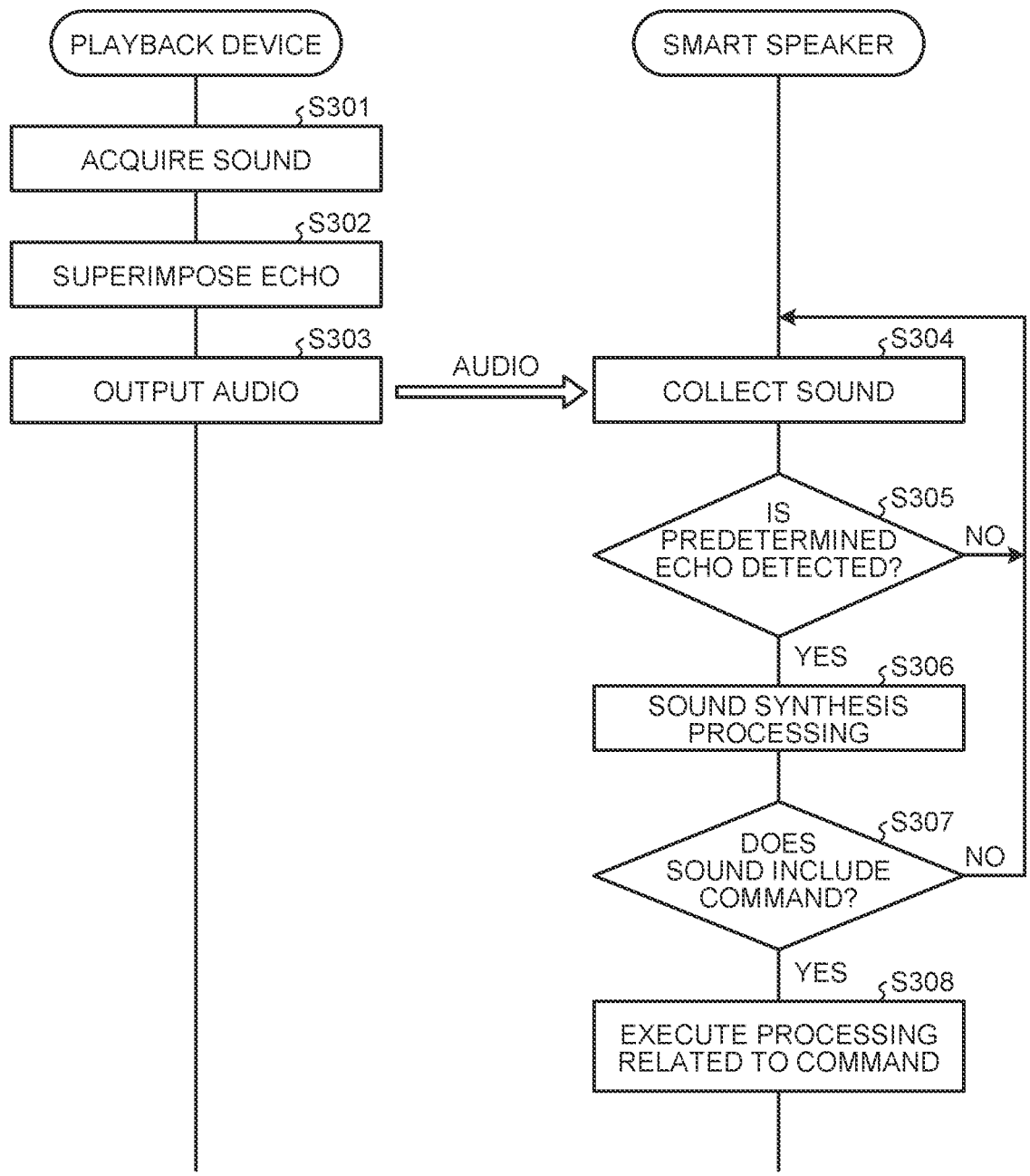
FIG. 14 is a sequence diagram explaining an example of an information processing method according to the embodiment.

Next, an information processing method according to the fourth embodiment of the present disclosure will be described with reference to FIG. 14. FIG. 14 is a sequence diagram illustrating an example of the information processing method according to the present embodiment. Specifically, as illustrated in FIG. 14, the information processing method according to the present embodiment can mainly include steps from step S301 to step S308. Details of these steps according to the present embodiment will be described below.

The playback device 10c acquires (collects) uttered speech of the user 40 (step S301). Next, the playback device 10c delays the uttered speech acquired in step S101 by a predetermined time (delay time) t or by a predetermined number of times and thereby generates (an) echo(es) and superimposes the echo(es) on the uttered speech (step S302). Then, the playback device 10c outputs the echo(es) (step S303).

The smart speaker 20*a* directly collects the uttered speech of the user 40 and further collects audio output by the playback device 10*c* (step S304). Next, the smart speaker 20*a* determines whether or not a predetermined number of echoes or an echo having a predetermined delay time t has been detected from the sound that has been collected (step S305). If it is detected (step S305: Yes), the smart speaker 20*a* proceeds to step S306, and if it is not detected (step S305: No), the smart speaker 20*a* returns to step S304 described above.

Next, the smart speaker 20*a* performs synthesis processing of the sound collected in step S304 described above (step S306). Then, the smart speaker 20*a* determines whether or not a predetermined command is included in the synthesized sound synthesized in step S306 described above (step S307). If a predetermined command is included (step S307: Yes), the smart speaker 20*a* proceeds to step S308, and if not (step S307: No), the smart speaker 20*a* returns to step S304 described above.

The smart speaker 20*a* executes the task related to the command that has been determined to be included in step S307 and ends the processing (step S308).

That is, in the present embodiment, in a case where a predetermined echo is superimposed on the uttered speech of the user 40, the smart speaker 20*a* responds to the command included in the uttered speech of the user 40.

As described above, in the present embodiment, the smart speaker 20*a* can recognize that the user 40 is the utterance subject on the basis of the number of echoes superimposed or the delay time t of an echo by detecting the echo superimposed on the uttered speech of the user 40. Therefore, according to the present embodiment, even in a case where the playback device 10 such as a TV is present in the vicinity of the smart speaker 20*a*, the smart speaker 20*a* can distinguish between uttered speech of the user 40 and reproduction audio output by the playback device 10 such as a TV. As a result, in the present embodiment, the smart speaker 20*a* responds only to a command included the uttered speech of the user 40 and does not respond to reproduction audio of the playback device 10 such as a TV, and thus erroneous operation not intended by the user 40 does not occur. Furthermore, in the present embodiment, by setting different delay times t or different numbers of echoes to be superimposed for each person, the smart speaker 20*a* can recognize uttered speech of each person from uttered speech of a plurality of persons that has been collected and respond only to a command included in uttered speech of a specific person.

6. Fifth Embodiment

Figure 15:
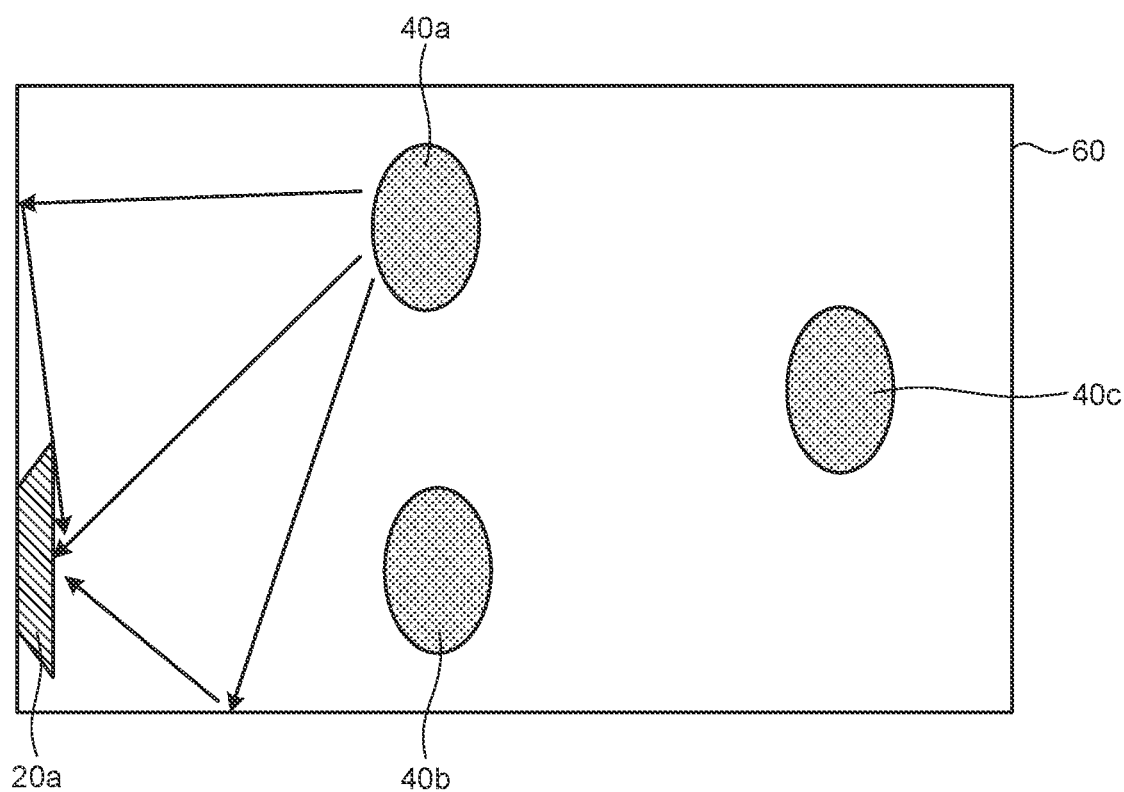
FIG. 15 is an explanatory diagram for explaining a fifth embodiment of the present disclosure.

In the above-described fourth embodiment, the user 40 wears the microphone 50 illustrated in FIG. 10. However, in a fifth embodiment of the present disclosure described below, by applying the information processing system according to the present embodiment to an acoustically closed space, the use of the microphone 50 can be avoided. As a result, in the present embodiment, it is possible to avoid an increase in the cost of the system configuration. Hereinafter, the present embodiment will be described with reference to FIG. 15. FIG. 15 is an explanatory diagram for describing the present embodiment.

As illustrated in FIG. 15, an information processing system according to the present embodiment is used in an acoustically closed space 60 in which a predetermined user 40*a* is present. In such a space 60, uttered speech of the user 40*a* is reflected by walls of the space 60 and transmitted to a smart speaker 20*a* through a plurality of paths. Moreover, if the position of the user 40*a* in the space 60 is known, a delay time t between the main sound in the uttered speech of the user 40*a* and an echo transmitted through a transmission path different from that of the main sound can be calculated in advance. Therefore, in the present embodiment, the smart speaker 20*a* can detect the uttered speech of the user 40*a* on which the echo having the predetermined delay time t included in the sound that has been collected is superimposed by referring to the delay time t calculated in advance.

As a result, according to the present embodiment, since the microphone 50 is not installed or the like, it is possible to avoid an increase in the cost of the system construction. Note that, in the present embodiment, similarly to the user 40*a*, if the positions of users 40*b* and 40*c* in the space 60 are each known, delay times t between the main sound in uttered speech of the users 40*b* and 40*c* and an echo can be calculated in advance. Therefore, in the present embodiment, the smart speaker 20*a* can also detect the uttered speech of the users 40*b* and 40*c* on which the echoes having the predetermined delay time t included in the sound that has been collected are superimposed by referring to the delay time t calculated in advance.

6.1 Information Processing System

The configuration example of the information processing system according to the present embodiment includes only the smart speaker 20*a* installed in the space 60, and the outline of the smart speaker 20*a* is similar to that of the first embodiment, and thus description thereof is omitted here.

6.2 Smart Speaker

Since the smart speaker 20 according to the present embodiment is in common with the smart speaker 20*a* according to the fourth embodiment, the description of the smart speaker 20*a* according to the present embodiment is omitted here.

6.3 Information Processing Method

Figure 16:
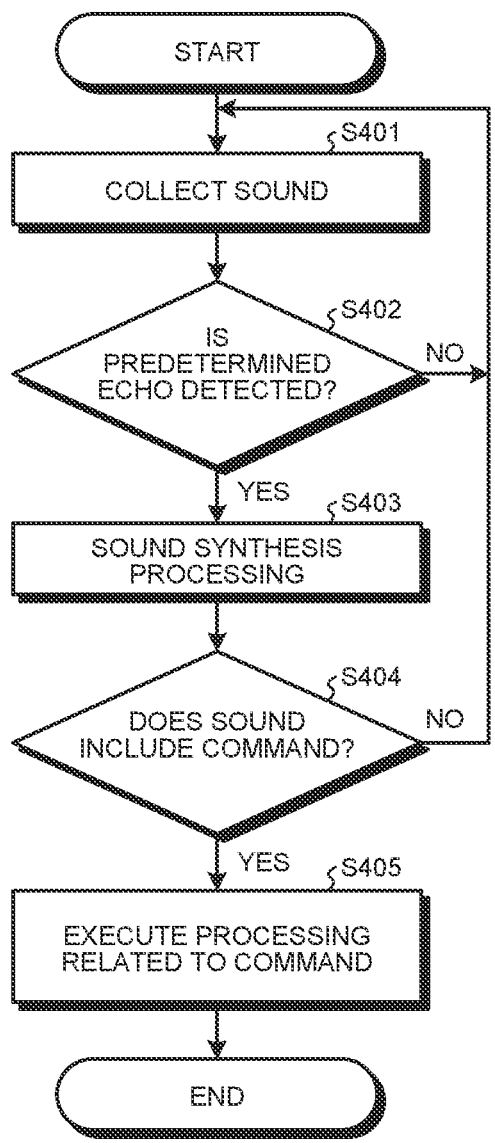
FIG. 16 is a sequence diagram explaining an example of an information processing method according to the embodiment.

Next, an information processing method according to the fifth embodiment of the present disclosure will be described with reference to FIG. 16. FIG. 16 is a flowchart illustrating an example of the information processing method according to the present embodiment. Specifically, as illustrated in FIG. 16, the information processing method according to the present embodiment can mainly include steps from step S401 to step S405. Details of these steps according to the present embodiment will be described below.

The smart speaker 20*a* collects uttered speech of the user 40*a* on which an echo is superimposed (step S401). Next, the smart speaker 20*a* determines whether or not an echo having a predetermined delay time t (or a predetermined number of echoes) has been detected from the sound that has been collected (step S402). If it is detected (step S402: Yes), the smart speaker 20*a* proceeds to step S403, and if it is not detected (step S402: No), the smart speaker 20*a* returns to step S401 described above.

Next, the smart speaker 20*a* performs synthesis processing of the sound collected in step S401 described above (step S403). Then, the smart speaker 20*a* determines whether or not a predetermined command is included in the synthesized sound synthesized in step S403 (step S404). If a predetermined command is included (step S404: Yes), the smart speaker 20*a* proceeds to step S405, and if it is not included (step S404: No), the smart speaker 20*a* returns to step S401 described above.

The smart speaker 20*a* executes a task related to the command determined to be included in step S404 and ends the processing (step S405).

As described above, according to the present embodiment, since the microphone 50 is not installed or the like, it is possible to avoid an increase in the cost of the system construction.

Figure 17:
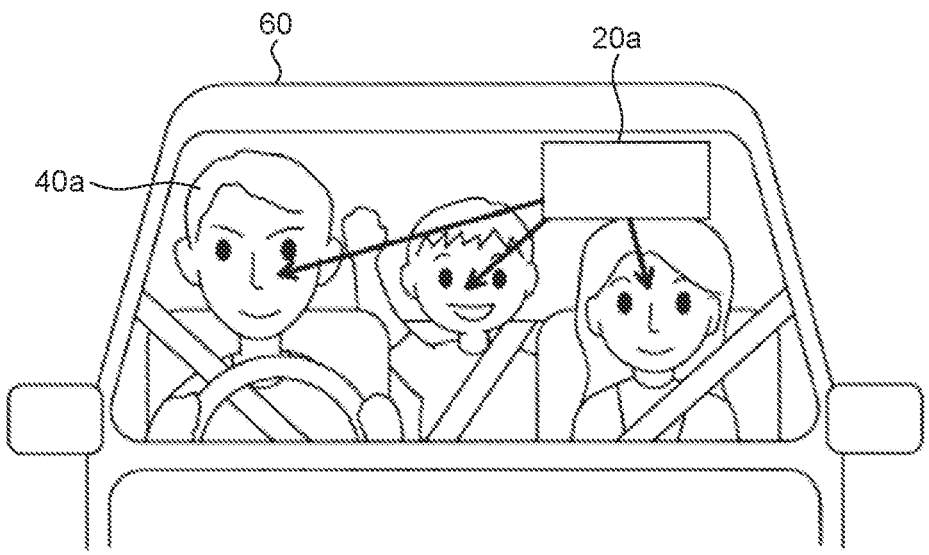
FIG. 17 is an explanatory diagram for explaining an example of a space in FIG. 15.

Next, an example of the space 60 according to the present embodiment will be described with reference to FIG. 17. FIG. 17 is an explanatory diagram for explaining an example of the space 60 in FIG. 15. Specifically, in the example illustrated in FIG. 17, the space 60 is a passenger compartment in a vehicle.

Specifically, in a case where the acoustically closed space 60 is a passenger compartment in a vehicle, the space 60 is surrounded by, for example, glass such as a windshield, side glasses, or a rear glass. Since glass has a high reflection coefficient of sound, generation of an echo due to reflection can be expected.

In addition, in a case where the acoustically closed space 60 is a passenger compartment in a vehicle, it is possible to detect the position of a seat where a driver 40*a* is seated (position along the front-rear direction of the vehicle, height of the seat face, and the like) and the position (height or the like) of a headrest provided to the seat. Moreover, the position of the mouth of the driver 40*a* in the passenger compartment can be detected from the position of the seat or the headrest. Furthermore, in the present embodiment, since the distance from the mouth of the driver 40*a* to each of the glasses can be acquired in advance, if the position of the smart speaker 20*a* is fixed, the delay time t of an echo related to uttered speech of the driver 40*a* can be calculated in advance. Furthermore, in the present embodiment, the smart speaker 20*a* can detect uttered speech of the driver (predetermined user) 40*a* by detecting uttered speech on which an echo having the delay time t that has been calculated in advance is superimposed. As a result, according to the present embodiment, it is possible to detect a command (for example, a command for activating an autonomous driving system mounted on the vehicle) included in the uttered speech of the driver 40*a* without installing the microphone 50 or the like for generating an echo. Furthermore, in the present embodiment, similarly to the driver 40*a*, it is also possible to detect uttered speech of persons 40*b* and 40*c* seated in the passenger seat and a rear seat.

Note that, in the present embodiment, even in a case where the vehicle is a convertible car, generation of an echo due to reflection by the windshield can be expected since there is a windshield. Furthermore, in the present embodiment, in order to accurately calculate the delay time t, it is preferable to collect uttered speech of a seated person and an echo as calibration operation before traveling or the like and to correct the delay time t calculated on the basis of the sound collection result.

As described above, according to the present embodiment, since the microphone 50 is not installed or the like, it is possible to avoid an increase in the cost of the system construction.

7. Examples

The details of the information processing method of the embodiment of the present disclosure have been described above. Next, an example of the information processing method according to the present embodiment will be described more specifically with reference to a specific example. Note that the following examples are merely examples of the information processing method according to the embodiments of the present disclosure, and the information processing methods according to the embodiments of the present disclosure are not limited to the following examples.

7.1 First Example

First, a first example applied to autonomous driving will be described in comparison with a comparative example.

Comparative Example

The user 40 brings a smartphone (an example of the playback device 10) into an autonomous car and rides the autonomous car. When the user 40 who has ridden utters, to an autonomous driving system (an example of the smart speaker 20) of the autonomous car, "Go to the company" (an example of a command) subsequent to "My Car", which is a trigger word of the system, the autonomous car starts autonomous traveling toward the company of the user 40.

Since it is autonomous driving, the user 40 falls asleep while viewing a streaming video on the smartphone 10 without holding the steering wheel. During the traveling, a reproduction audio of "My car, the destination is Tokyo Station" in one scene of the streaming video is output from the smartphone 10.

The autonomous driving system 20 recognizes the speech of "My car, the destination is Tokyo Station" output from the smartphone 10, and the autonomous car starts autonomous traveling toward Tokyo Station.

Then, when the user 40 wakes up with a speech of "Arrived" of the navigation system, the place of arrival is not the company but Tokyo Station.

Examples

Next, a case in which the above-described embodiment of the present disclosure is applied to the smartphone 10 in the case of the above comparative example will be described.

Also in the present example, similarly to the comparative example, the reproduction audio of "My car, the destination is Tokyo Station" in one scene of the streaming video is output from the smartphone 10. However, in the present example, since predetermined noise is superimposed on the reproduction audio, the autonomous driving system 20 does not recognize the speech of "My car, the destination is Tokyo Station" that is output from the smartphone 10. Therefore, the autonomous car continues autonomous traveling toward the company of the user 40.

Note that, in the present example, applying the second embodiment described above makes it possible to detect that the smartphone 10 is at a predetermined distance from the autonomous driving system 20, and thus it is possible to superimpose predetermined noise on reproduction audio by using the detection as a trigger.

7.2 Second Example

Next, explanation will be given on a second example of application to autonomous driving having a function of stopping when warning sound of an emergency vehicle is detected. In the present example, it is based on a premise that predetermined sound is superimposed on the warning sound of emergency vehicles reproduced by an in-vehicle AV system (an example of the playback device 10). For example, let us set a premise that there is a rule that predetermined sound is superimposed on the warning sound of emergency vehicles in the content in accordance with a guideline or the like for content creation. In such a case, since the predetermined noise is superimposed on the reproduction audio of the in-vehicle AV system 10, the autonomous driving system 20 does not recognize warning sound of an emergency vehicle output from the in-vehicle AV system 10, and thus the autonomous car does not stop.

8. Summary

As described above, in the embodiments of the present disclosure, it is possible to avoid erroneous operation by speech recognition.

9. Hardware Configuration

Figure 18:
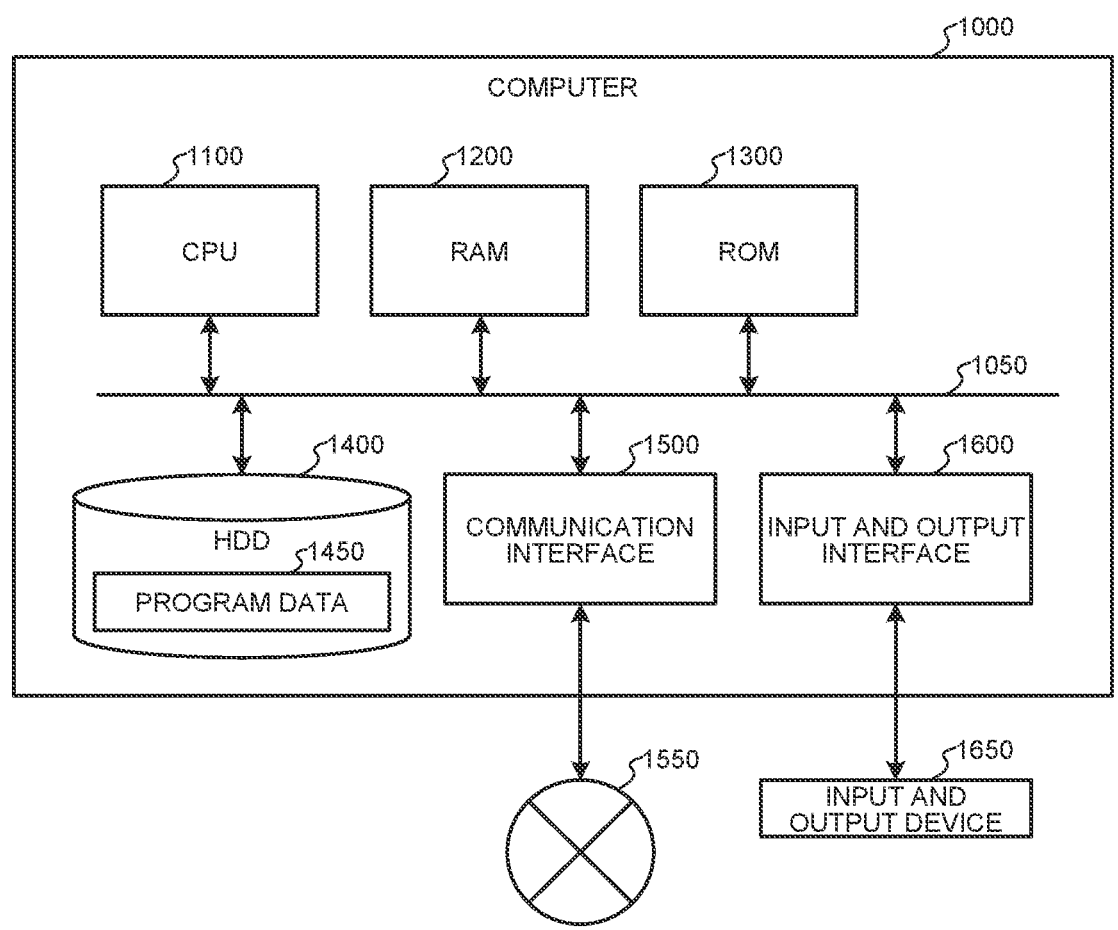
FIG. 18 is a hardware configuration diagram illustrating an example of a computer that implements functions of a smart speaker.

The information processing devices such as the smart speaker 20 according to the embodiments described above are implemented by, for example, a computer 1000 having a configuration as illustrated in FIG. 18. Hereinafter, the smart speaker 20 according to an embodiment of the present disclosure will be described as an example. FIG. 18 is a hardware configuration diagram illustrating an example of the computer 1000 that implements the functions of the smart speaker 20. The computer 1000 includes a CPU 1100, a RAM 1200, a read only memory (ROM) 1300, a hard disk drive (HDD) 1400, a communication interface 1500, and an input and output interface 1600. The units of the computer 1000 are connected by a bus 1050.

The CPU 1100 operates in accordance with a program stored in the ROM 1300 or the HDD 1400 and controls each of the units. For example, the CPU 1100 loads a program stored in the ROM 1300 or the HDD 1400 in the RAM 1200 and executes processes corresponding to various programs.

The ROM 1300 stores a boot program such as a basic input output system (BIOS) executed by the CPU 1100 when the computer 1000 is activated, a program dependent on the hardware of the computer 1000, and the like.

The HDD 1400 is a computer-readable recording medium that non-transiently records a program to be executed by the CPU 1100, data used by such a program, and the like. Specifically, the HDD 1400 is a recording medium that records an information processing program according to the present disclosure, which is an example of program data 1450.

The communication interface 1500 is an interface for the computer 1000 to be connected with an external network 1550 (for example, the Internet). For example, the CPU 1100 receives data from another device or transmits data generated by the CPU 1100 to another device via the communication interface 1500.

The input and output interface 1600 is an interface for connecting an input and output device 1650 and the computer 1000. For example, the CPU 1100 receives data from the input and output device 1650 such as a keyboard, a mouse, and a microphone via the input and output interface 1600. In addition, the CPU 1100 transmits data to an output device such as a display, a speaker, or a printer via the input and output interface 1600. Furthermore, the input and output interface 1600 may function as a media interface that reads a program or the like recorded in a predetermined recording medium. A medium refers to, for example, an optical recording medium such as a digital versatile disc (DVD) or a phase change rewritable disk (PD), a magneto-optical recording medium such as a magneto-optical disk (MO), a tape medium, a magnetic recording medium, a semiconductor memory, or the like.

For example, in a case where the computer 1000 functions as the smart speaker 20 according to the embodiment of the present disclosure, the CPU 1100 of the computer 1000 implements the functions of the control unit 200 or other units by executing a program stored in the RAM 1200. In addition, the HDD 1400 stores the information processing program and the like according to the present disclosure. Note that although the CPU 1100 reads the program data 1450 from the HDD 1400 and executes the program data 1450, as another example, the CPU 1100 may acquire these programs from another device via the external network 1550.

Furthermore, the information processing device according to the present embodiment may be applied to a system including a plurality of devices based on a premise of connection to a network (or communication between devices), such as cloud computing. That is, the information processing devices according to the present embodiment described above can be implemented, for example, as the information processing systems according to the present embodiment by a plurality of devices.

An example of the hardware configuration of an information processing device 900 has been described above. Each of the above components may be configured using a general-purpose member or may be configured by hardware specialized in the function of each component. Such a configuration can be modified as appropriate depending on the technical level at the time of implementation.

10. Supplements

Note that the embodiments of the present disclosure described above can include, for example, an information processing method executed by the information processing devices or the information processing systems as described above, a program for causing the information processing devices to function, and a non-transitory physical medium in which the program is recorded. Alternatively, the program may be distributed via a communication line (including wireless communication) such as the Internet.

Moreover, each of the steps in the information processing methods according to the embodiments of the present disclosure described above may not necessarily be processed in the described order. For example, each of the steps may be processed in an order modified as appropriate. In addition, each of the steps may be partially processed in parallel or separately instead of being processed in time series. Furthermore, the processing of each of the steps may not necessarily be performed in accordance with the described method and may be performed, for example, by another method by another functional unit.

Although the preferred embodiments of the present disclosure have been described in detail by referring to the accompanying drawings, the technical scope of the present disclosure is not limited to such examples. It is obvious that a person having ordinary knowledge in the technical field of the present disclosure can conceive various modifications or variations within the scope of the technical idea described in the claims, and it is naturally understood that these also belong to the technical scope of the present disclosure.

Furthermore, the effects described in the present specification are merely illustrative or exemplary and are not limiting. That is, the technology according to the present disclosure can achieve other effects that are obvious to those skilled in the art from the description of the present specification together with or instead of the above effects.

Note that the following configurations also belong to the technical scope of the present disclosure.

(1) An information processing system comprising:
an information processing device and a playback device,
wherein the information processing device comprises:
a first detection unit that detects, from collected sound, audio processing superimposed on the sound by the playback device;
a specifying unit that specifies an utterance subject of the sound on a basis of the audio processing that has been detected; and
a determination unit that determines whether or not to execute a command included in the sound on a basis of a result of the specification.

(2) The information processing system according to (1),
wherein, in a case where the first detection unit detects that predetermined noise is superimposed on the sound as the audio processing,
the specifying unit specifies that the utterance subject of the sound is the playback device, and
the determination unit determines not to execute the command included in the sound on a basis of the result of the specification.

(3) The information processing system according to (1) or (2),
wherein, in a case where the first detection unit detects that predetermined noise is not superimposed on the sound as the audio processing,
the specifying unit specifies that the utterance subject of the sound is a predetermined user, and
the determination unit determines to execute the command included in the sound on a basis of the result of the specification.

(4) The information processing system according to (3),
wherein the playback device comprises:
a processing unit that performs audio processing of superimposing the predetermined noise on reproduction audio; and
an output unit that outputs the reproduction audio having been subjected to the audio processing.

(5) The information processing system according to (4),
wherein the playback device further comprises a second detection unit that detects that the reproduction audio includes a predetermined word, and
in a case where the second detection unit detects that the predetermined word is included, the processing unit performs the audio processing of superimposing the predetermined noise on the reproduction audio reproduced after the predetermined word.

(6) The information processing system according to (5),
wherein the playback device further comprises a storage unit that stores information of the predetermined word, and
the predetermined word is a command to cause the information processing device to perform a predetermined operation when input to the information processing device by utterance of the predetermined user.

(7) The information processing system according to (4),
wherein the playback device further comprises a third detection unit that detects that the information processing device is present within a predetermined distance from the playback device, and
in a case where the third detection unit detects that the information processing device is present within the predetermined distance, the processing unit performs the audio processing of superimposing the predetermined noise on the reproduction audio.

(8) The information processing system according to any one of (2) to (7),
wherein the predetermined noise is white noise.

(9) The information processing system according to (1),
wherein the first detection unit detects the number of echoes superimposed on the sound or a delay time of an echo as the audio processing.

(10) The information processing system according to (9),
wherein, in a case where the first detection unit detects, as the audio processing, that the number of echoes superimposed on the sound is a predetermined number or that the delay time of the echo is a predetermined time,
the specifying unit specifies that the utterance subject of the sound is a predetermined user, and
the determination unit determines to execute the command included in the sound on a basis of the result of the specification.

(11) The information processing system according to (10),
wherein the information processing device further comprises a synthesis unit that synthesizes waveforms of the sound that has been collected and the echo.

(12) The information processing system according to (10) or (11),
wherein the playback device comprises:
a sound collection unit that is worn by the predetermined user and collects uttered speech of the predetermined user;
a generation unit that generates the echo by delaying, by a predetermined time, the uttered speech that has been collected; and
an output unit that outputs the echo that has been generated.

(13) The information processing system according to (12),
wherein the generation unit generates a predetermined number of the echoes by sequentially delaying, by a predetermined time, the uttered speech that has been collected.

(14) The information processing system according to any one of (1) to (13),
wherein the information processing device is a smart speaker.

(15) An information processing device comprising:
a first detection unit that detects, from sound that has been collected, the number of echoes superimposed on the sound or a delay time of an echo as audio processing;
a specifying unit that specifies an utterance subject of the sound on a basis of the audio processing that has been detected; and
a determination unit that determines whether or not to execute a command included in the sound on a basis of a result of the specification,
wherein the information processing device is installed in an acoustically closed space in which a predetermined user is present.

(16) The information processing device according to (15),
wherein, in a case where the first detection unit detects, as the audio processing, that the number of echoes superimposed on the sound is a predetermined number or that the delay time of the echo is a predetermined time,
the specifying unit specifies that the utterance subject of the sound is the predetermined user, and
the determination unit determines to execute the command included in the sound on a basis of the result of the specification.
(17) The information processing device according to (15) or (16), wherein the space is a passenger compartment of a vehicle.
(18) An information processing method comprising the steps of:
by an information processing device,
detecting, from collected sound, audio processing superimposed on the sound by a playback device;
specifying an utterance subject of the sound on a basis of the audio processing that has been detected; and
determining whether or not to execute a command included in the sound on a basis of a result of the specification.
(19) A program for causing a computer to execute the functions of:
detecting, from collected sound, audio processing superimposed on the sound by a playback device;
specifying an utterance subject of the sound on a basis of the audio processing that has been detected; and
determining whether or not to execute a command included in the sound on a basis of a result of the specification.

REFERENCE SIGNS LIST 10, 10a, 10b, 10c PLAYBACK DEVICE
20, 20a SMART SPEAKER
40 USER
50 MICROPHONE
60 SPACE
100, 200 CONTROL UNIT
102 CONTENT ACQUISITION UNIT
104 DECODING UNIT
106 PROCESSING UNIT
108 DAC-DRIVER-AMPLIFIER UNIT
110 AUDIO OUTPUT UNIT
112 DISPLAY UNIT
114 SENSOR UNIT
116, 204 DETECTION UNIT
118, 218 STORAGE UNIT
120 COMMUNICATION UNIT
122, 202 SOUND COLLECTION UNIT
124 GENERATION UNIT
206 SPECIFYING UNIT
208 DETERMINATION UNIT
210 COMMAND EXTRACTION UNIT
212 SYNTHESIS UNIT

The invention claimed is:
1. An information processing system, comprising:
an information processing device and a playback device, wherein
the playback device comprises a first central processing unit (CPU) configured to:
detect a specific word in a reproduction audio;
execute an audio process to superimpose a noise on the reproduction audio after the specific word; and
output the reproduction audio on which the noise is superimposed, and
the information processing device comprises a second CPU configured to:
control collection of the reproduction audio output by the playback device;
detect superimposition of the noise on the collected reproduction audio;
specify an utterance subject, of the collected reproduction audio, based on the detection of the superimposition of the noise on the reproduction audio; and
determine whether to execute a command in the collected reproduction audio, wherein the determination is based on a result of the specification.
2. The information processing system according to claim 1, wherein the second CPU is further configured to:
specify that the utterance subject of the collected reproduction audio is the playback device based on the detection of the superimposition of the noise on the collected reproduction audio; and
determine not to execute the command included in the collected reproduction audio based on the specification that the playback device is the utterance subject.
3. The information processing system according to claim 2, wherein the noise is a white noise.
4. The information processing system according to claim 1, wherein the second CPU is further configured to:
specify that the utterance subject of the collected reproduction audio is a user in a case where the noise is not superimposed on the collected reproduction audio; and
determine execution of the command included in the collected reproduction audio based on the specification that the user is the utterance subject.
5. The information processing system according to claim 4, wherein
the playback device further comprises a storage unit configured to store information of the specific word, and
the specific word is a command to cause the information processing device to perform an operation in a case where the specific word is input to the information processing device by utterance of the user.
6. The information processing system according to claim 4, wherein the first CPU is further configured to:
detect that the information processing device is present within a specific distance from the playback device; and
execute the audio process for the superimposition of the noise on the reproduction audio based on the detection that the information processing device is present within the specific distance.
7. The information processing system according to claim 1, wherein the second CPU is further configured to detect at least one of a number of echoes superimposed on the collected reproduction audio or a delay time of an echo of the number of echoes.
8. The information processing system according to claim 7, wherein the second CPU is further configured to:
detect that at least one of:
the number of echoes superimposed on the collected reproduction audio is a specific number, or
the delay time of the echo is a specific time;
specify that the utterance subject is a user based on the detection that the at least one of the number of echoes superimposed on the collected reproduction audio is the specific number or the delay time of the echo is the specific time; and determine, based on the specification that the user is the utterance subject, the execution of the command included in the collected reproduction audio.

9. The information processing system according to claim 8, wherein the second CPU is further configured to synthesize waveforms of the collected reproduction audio and the echo.

10. The information processing system according to claim 8, wherein
the playback device further comprises a sound collection unit wearable by the user,
the sound collection unit is configured to collect uttered speech of the user, and
the first CPU is further configured to:
delay the collected uttered speech to generate the echo; and
output the generated echo.

11. The information processing system according to claim 10, wherein the first CPU is further configured to sequentially delay, by a determined time, the collected uttered speech to generate the number of echoes.

12. The information processing system according to claim 1, wherein the information processing device is a smart speaker.

13. An information processing device, comprising:
a central processing unit (CPU) configured to:
control collection of a sound;
detect, as an audio process, at least one of a number of echoes superimposed on the collected sound or a delay time of an echo of the number of echoes;
specify an utterance subject of the collected sound based on the detection of the audio process; and
determine whether to execute a command included in the collected sound, wherein
the determination is based on a result of the specification, and
the information processing device is installed in an acoustically closed space in which a user is present.

14. The information processing device according to claim 13, wherein the CPU is further configured to:
detect that the at least one of the number of echoes superimposed on the collected sound is a specific number or the delay time of the echo is a specific time;
specify that the utterance subject of the sound is the user based on the detection that the at least one of the number of echoes superimposed on the collected sound is the specific number, or the delay time of the echo is the specific time; and
determine, based on the specification that the user is the utterance subject, the execution of the command included in the collected sound.

15. The information processing device according to claim 13, wherein the acoustically closed space is a passenger compartment of a vehicle.

16. An information processing method, comprising:
detecting, by a playback device, a specific word in a reproduction audio;
executing, by the playback device, an audio process to superimpose a noise on the reproduction audio after the specific word;
outputting, by the playback device, the reproduction audio on which the noise is superimposed to an information processing device;
controlling, by the information processing device, collection of the reproduction audio output by the playback device;
detecting, by the information processing device, superimposition of the noise on the collected reproduction audio;
specifying, by the information processing device, an utterance subject, of the collected reproduction audio, based on the detection of the superimposition of the noise on the reproduction audio; and
determining, by the information processing device, whether or not to execute a command in the collected reproduction audio, wherein the determination is based on a result of the specification.

17. A non-transitory computer-readable medium, having stored thereon, computer-executable instructions that, when executed by a computer, cause the computer to execute operations, the operations comprising:
detecting, by a playback device, a specific word in a reproduction audio;
executing, by the playback device, an audio process to superimpose a noise on the reproduction audio after the specific word;
outputting, by the playback device, the reproduction audio on which the noise is superimposed to an information processing device;
controlling, by the information processing device, collection of the reproduction audio output by the playback device;
detecting by the information processing device, superimposition of the noise on the collected reproduction audio;
specifying an utterance subject, of the collected reproduction audio, based on the detection of the superimposition of the noise on the reproduction audio; and
determining whether to execute a command in the collected reproduction audio, wherein the determination is based on a result of the specification.

* * * * *